US011940386B2

(12) United States Patent
Chrostowski et al.

(10) Patent No.: US 11,940,386 B2
(45) Date of Patent: Mar. 26, 2024

(54) PHOTONIC SENSOR USING A FIXED-WAVELENGTH LASER

(71) Applicant: The University of British Columbia, Vancouver (CA)

(72) Inventors: Lukas Chrostowski, Vancouver (CA); Sudip Shekhar, Vancouver (CA); Samantha Grist, Vancouver (CA); Karen C. Cheung, Vancouver (CA); Mohammed Ali Al-Qadasi, Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 17/903,931

(22) Filed: Sep. 6, 2022

(65) Prior Publication Data

US 2023/0081317 A1 Mar. 16, 2023

Related U.S. Application Data

(63) Continuation of application No. PCT/CA2021/050497, filed on Apr. 13, 2021.
(Continued)

(51) Int. Cl.
*G01N 21/77* (2006.01)
*G01N 21/39* (2006.01)

(52) U.S. Cl.
CPC ........... *G01N 21/774* (2013.01); *G01N 21/39* (2013.01); *G01N 21/7746* (2013.01); *G01N 2021/7779* (2013.01); *G01N 2021/7789* (2013.01)

(58) Field of Classification Search
CPC .. G01N 21/39; G01N 21/774; G01N 21/7746; G01N 21/7703; G01N 2021/7789; G01N 2021/7779
See application file for complete search history.

(56) References Cited

U.S. PATENT DOCUMENTS

| 5,094,819 A | 3/1992 | Yager et al. |
| 5,465,151 A | 11/1995 | Wybourne et al. |

(Continued)

FOREIGN PATENT DOCUMENTS

| CN | 101048942 A | 9/2014 |
| CN | 104020137 B | 11/2016 |

(Continued)

OTHER PUBLICATIONS

Iqbal, M; Gleeson, M A; Spaugh, B; Tybor, F; Gunn, W G; Hochberg, M; Baehr-Jones, T; Bailey, R C; Gunn, L C, Label-Free Biosensor Arrays based on Silicon Ring Resonators and High-Speed Optical Scanning Instrumentation. IEEE J. Sel. Top. Quantum Electron 2010, 16, 654-661.

(Continued)

*Primary Examiner* — Sang H Nguyen
(74) *Attorney, Agent, or Firm* — Todd A. Rattray; Oyen Wiggs Green & Mutala LLP

(57) ABSTRACT

A sensor architecture that uses fixed wavelength light and tunes a wavelength dependent response of a sensor may be used for detecting analytes in a wide range of applications. The sensor architecture is based on optical resonators or interferometers comprising optical waveguides. A resonance wavelength and/or transmission/reflection spectrum are affected by presence of an analyte adsorbed on a surface of the waveguide, and a setting of a phase modulator. The sensors include a sensor portion where part of the waveguide is exposed to a sample for sensing, and a phase modulator part. The phase modulator part may include a heater that is controlled to tune, or sweep, or modulate the resonant wavelength and/or spectrum of the sensor.

29 Claims, 12 Drawing Sheets

Related U.S. Application Data

(60) Provisional application No. 63/009,033, filed on Apr. 13, 2020.

(56) References Cited

U.S. PATENT DOCUMENTS

| | | | | |
|---|---|---|---|---|
| 6,650,810 | B1* | 11/2003 | Lieberman | G02B 6/124 385/32 |
| 7,394,547 | B2 | 7/2008 | Tan et al. | |
| 8,941,828 | B2 | 1/2015 | Loock et al. | |
| 9,366,635 | B2 | 6/2016 | Suh et al. | |
| 9,846,126 | B2 | 12/2017 | Gunn, III et al. | |
| 9,921,165 | B2 | 3/2018 | Bailey et al. | |
| 9,983,206 | B2 | 5/2018 | Bailey et al. | |
| 10,365,224 | B2 | 7/2019 | Gunn, III | |
| 2002/0189945 | A1* | 12/2002 | Ruggiero | G01N 21/171 204/601 |
| 2005/0195472 | A1 | 9/2005 | Tang | H01S 3/0632 359/333 |
| 2005/0225828 | A1* | 10/2005 | Zakhleniuk | G02F 1/01708 359/247 |
| 2005/0269490 | A1* | 12/2005 | Loock | G01N 21/41 250/227.14 |
| 2006/0170931 | A1* | 8/2006 | Guo | G01N 21/7746 356/480 |
| 2007/0048746 | A1* | 3/2007 | Su | B82Y 15/00 435/7.1 |
| 2008/0043248 | A1* | 2/2008 | Ozcan | G01N 21/774 356/517 |
| 2008/0291460 | A1* | 11/2008 | Khatchaturov | G01J 1/04 356/478 |
| 2010/0103429 | A1* | 4/2010 | Cottier | G01N 21/7703 356/477 |
| 2015/0236809 | A1* | 8/2015 | Dong | H01S 5/142 398/79 |
| 2020/0003696 | A1 | 1/2020 | Pleros et al. | |

FOREIGN PATENT DOCUMENTS

| | | |
|---|---|---|
| CN | 104655566 B | 6/2017 |
| CN | 105092531 B | 10/2017 |
| WO | 2012109733 A1 | 8/2012 |
| WO | 2021048565 A1 | 3/2021 |

OTHER PUBLICATIONS

Luchansky, M S; Washburn, A L; Martin, T A; Iqbal, M; Gunn, L C; Bailey, R C. Characterization of the evanescent field profile and bound mass sensitivity of a label-free silicon photonic microring resonator biosensing platform. Biosens. Bioelectron. 2010, doi:10.1016/j.bios.2010.1007.1010.

Talebi Fard et al, Silicon-on-insulator sensors using integrated resonance-enhanced defect-mediated photodetectors, Optics Express vol. 22, Issue 23, pp. 28517-28529 (2014).

Wei Shi et al, Silicon photonic grating-assisted, contra-directional couplers, Optics Express vol. 21, Issue 3, pp. 3633-3650 (2013).

Chrostowski et al., "A silicon photonic evanescent-field sensor architecture using a fixed-wavelength laser", Mar. 5, 2021.

Luan et al., "Silicon Photonic Biosensors Using Label-Free Detection", Sensors 2018.

Dias et. al., "Cost-effective, CMOS-compatible, label-free biosensors using doped silicon detectors and a broadband source", CLEO 2019.

Luan et. al., "Enhanced sensitivity of subwavelength multibox waveguide microring resonator labelfree biosensors", IEEE Journal of Selected Topics in Quantum Electronics 2019.

Estevez, M.-C., Alvarez, M., and Lechuga, L. M., \Integrated optical devices for lab-on-a-chip biosensing applications, Laser Photonics Rev. 6(4), 463{487 (2012).

Song, J., Luo, X., Tu, X., Park, M. K., Kee, J. S., Zhang, H., Yu, M., Lo, G.-Q., and Kwong, D.-L., \Electrical tracing-assisted dual-microring label-free optical bio/chemical sensors, Opt. Express 20(4), 4189{4197 (2012).

* cited by examiner

PHOTONIC SENSOR USING A FIXED-WAVELENGTH LASER

CROSS-REFERENCE TO RELATED APPLICATIONS

This application is a continuation of Patent Cooperation Treaty application No. PCT/CA2021/050497 having an international filing date of 13 Apr. 2021 and entitled PHOTONIC SENSOR USING A FIXED-WAVELENGTH LASER, which in turn claims priority from, and for the purposes of the US the benefit under 35 U.S.C. § 119 of, U.S. application No. 63/009,033 filed 13 Apr. 2020 and entitled PHOTONIC SENSOR USING A FIXED-WAVELENGTH LASER. All of the applications referred to in this paragraph are hereby incorporated herein by reference.

FIELD

This invention relates to integrated photonic sensors. The sensors may be applied to detect molecules or analytes such as, for example, antibodies. Example applications include testing bodily fluids such as blood, saliva, urine etc. Other applications include testing to detect gases, contaminants in fluids, etc.

BACKGROUND

Rapid tests for detecting molecules such as proteins, antibodies, other molecules and other analytes of interest can be highly beneficial in fields including public health, industrial safety, and scientific research.

Evanescent-field photonic sensors have been shown to be effective for detecting a range of analytes. Evanescent-field biosensors are described, for example in Hutchinson, A. M. *Evanescent wave biosensors*. Mol Biotechnol 3, 47-54 (1995). https://doi.org/10.1007/BF02821334.

Components of evanescent wave biosensors sensors may be provided in integrated photonic platforms, such as silicon photonics. Such platforms may include components for detecting various analytes so that multiple measurements can be performed on the same sample (for example, blood) on the same chip. This allows, for example, measurements of several antibodies specific to several viral infections, with suitable controls.

An evanescent-field biosensor typically includes an optical resonator that includes an optical waveguide. A surface of the waveguide is functionalized to capture or otherwise interact with an analyte of interest. The functionalized surface may be designed to promote interaction primarily or only with specific analytes.

The interaction (e.g. binding or other reaction) of an analyte on the functionalized surface of the waveguide changes the effective index of refraction of the waveguide which, in turn, alters wavelengths at which the optical resonator resonates. Resonant wavelengths of the optical resonator are detected by scanning the wavelength of light supplied to the optical resonator.

Some current evanescent field biosensor systems include an instrument reader and actuator and cartridges containing integrated silicon photonic chips for the sensor. The instrument actuator includes a tunable laser. The tunable laser is swept to find the resonant wavelength, which is a proxy for the analyte concentration. The wavelength sweep needs to be performed quickly enough (kHz frequencies) and repeatedly during the measurement to accurately track the resonance and also extract the steady-state and dynamics of the analyte binding reactions. A problem with such systems is that the required tunable lasers are very expensive and are also bulky. The cost and size of such systems is an impediment to providing such systems in point-of-care applications.

The following references describe technology related to the field of biosensing.
1. U.S. Pat. No. 10,365,224: "LABEL-FREE OPTICAL SENSORS"
2. U.S. Pat. No. 9,921,165: "OPTICAL ANALYTE DETECTION SYSTEMS AND METHODS OF USE"
3. U.S. Pat. No. 9,846,126: "BIOSENSORS BASED ON OPTICAL PROBING AND SENSING"
4. U.S. Pat. No. 9,983,206 B2: "METHODS AND COMPOSITIONS FOR ENHANCING IMMUNOASSAYS"
5. U.S. Pat. No. 9,921,165 B2: "OPTICAL ANALYTE DETECTION SYSTEMS WITH MAGNETIC ENHANCEMENT AND METHODS OF USE"
6. WO2012109733A1: "FULLY INTEGRATED COMPLEMENTARY METAL OXIDE SEMICONDUCTOR (CMOS) FOURIER TRANSFORM INFRARED (FTIR) SPECTROMETER AND RAMAN SPECTROMETER"
7. Iqbal, M; Gleeson, M A; Spaugh, B; Tybor, F; Gunn, W G; Hochberg, M; Baehr-Jones, T; Bailey, R C; Gunn, L C, Label-Free Biosensor Arrays based on Silicon Ring Resonators and High-Speed Optical Scanning Instrumentation. IEEE J. Sel. Top. Quantum Electron 2010, 16, 654-661
8. Luchansky, M S; Washburn, A L; Martin, T A; Iqbal, M; Gunn, L C; Bailey, R C. Characterization of the evanescent field profile and bound mass sensitivity of a label-free silicon photonic microring resonator biosensing platform. Biosens. Bioelectron. 2010, doi:10.1016/j.bios.2010.1007.1010
9. Talebi Fard et al, Silicon-on-insulator sensors using integrated resonance-enhanced defect-mediated photodetectors, Optics Express Vol. 22, Issue 23, pp. 28517-28529 (2014).
10. Wei Shi et al, Silicon photonic grating-assisted, contra-directional couplers, Optics Express Vol. 21, Issue 3, pp. 3633-3650 (2013).
11. Lukas Chrostowski, Leanne Dias, Matthew Mitchell, Connor Mosquera, Enxiao Luan, Mohammed Al-Qadasi, Avineet Randhawa, Hassan R. Mojaver, Eric Lyall, Antoine Gervais, Raphael Dubé-Demers, Kashif Awan, Steven Gou, Odile Liboiron-Ladouceur, Wei Shi, Sudip Shekhar, Karen C. Cheung, "A silicon photonic evanescent-field sensor architecture using a fixed-wavelength laser" Proceedings Volume 11692, Optical Interconnects XXI; 116920W, SPIE OPTO, 2021

These references and all other references cited herein are hereby incorporated by reference for all purposes as if fully set out herein.

There remains a need for alternative systems and methods for detecting analytes. There is a particular need for such methods and systems that are practical for use in point-of-care applications.

SUMMARY

This invention has a number of aspects. These include, without limitation:
systems for detecting and/or quantifying analytes;
methods for detecting and/or quantifying analytes;

methods and apparatus for thermal analysis of analytes interacting with functionalized waveguides; and integrated photonics for use in systems for detecting analytes.

One aspect of the invention provides methods for monitoring a sample for at least one analyte. In non-limiting example applications the analyte may be a biomolecule such as an antibody, DNA, RNA, or the like. The method comprises: placing the sample in contact with a sensing portion of an optical waveguide and directing light having a fixed wavelength through the optical waveguide. Contact of the analyte with the waveguide alters a phase shift of the light effected by the sensing portion of the optical waveguide. The waveguide may be functionalized to interact with the analyte. The method modulates a phase shift of the light effected by a phase shift portion of the waveguide distinct from the sensing portion of the waveguide and monitors an intensity of the light relative to the phase shift of the light effected by the phase shift portion of the waveguide. The monitored intensity as a function of phase shift may be processed to detect the presence of the analyte, quantify the analyte and/or characterize the analyte. In some embodiments the processing detects a shift in a resonant frequency of a resonator that includes the waveguide. The light may be emitted from a fixed wavelength light source such as a fixed wavelength laser.

In some embodiments, modulating the phase shift of the light effected by the phase shift portion of the waveguide comprises heating the phase shift portion of the waveguide. Heating the phase shift portion of the waveguide optionally comprises passing an electrical current through a heater that is in thermal contact with the phase shift portion of the waveguide. The heater may, for example, comprise a metallic electrical conductor.

In some embodiments, heating the phase shift portion of the waveguide comprises passing an electrical current through the phase shift portion of the waveguide. The phase shift portion of the waveguide may, for example comprise doped silicon. In some embodiments the phase shift portion of the waveguide comprises an IPRH device.

In some embodiments, modulating the phase shift of the light effected by the phase shift portion of the waveguide comprises modulating carrier injection in a PIN junction integrated with the phase shift portion of the waveguide.

In some embodiments, modulating the phase shift of the light effected by the phase shift portion of the waveguide comprises modulating carrier depletion in a PN junction integrated with the phase shift portion of the waveguide.

In some embodiments, modulating the phase shift of the light effected by the phase shift portion of the waveguide comprises modulating an electro-optic effect in the phase shift portion of the waveguide.

In some embodiments, modulating the phase shift of the light effected by the phase shift portion of the waveguide comprises modulating a phase shift applied by a polymer phase modulator that is incorporated into the phase shift portion of the waveguide.

In some embodiments, modulating the phase shift effected by the phase shift portion comprises modulating the phase shift over a range of at least $\pi$ radians or at least $2\pi$ radians or at least $M\pi$ radians where M is an integer that is equal to or greater than 3.

In some embodiments the waveguide comprises an optical resonator and modulating the phase shift effected by the phase shift portion comprises causing the resonator to pass through at least one resonance. Modulating the phase shift effected by the phase shift portion comprises may cause the resonator to pass through a plurality of resonances. The resonances may be detected, for example, as dips or peaks in an output signal.

In some embodiments the resonator is a closed loop resonator such as a ring resonator (which may but does not necessarily follow a circular path) or a racetrack resonator.

In some embodiments, the resonator is a contra-directional coupler resonator.

In some embodiments, the resonator comprises a cavity resonator. In some embodiments, the cavity resonator comprises a Fabry-Perot cavity resonator, a 1 D or 2 D photonic crystal cavity resonator.

In some embodiments, the resonator comprises a Bragg grating resonator.

In some embodiments, the resonator comprises a plurality of sections of the waveguide connected to form a closed loop and different ones of the sections of the waveguide comprise different waveguide types. For example, the different waveguide types may include solid core waveguide and sub-wavelength grating waveguide. In some embodiments, the different waveguide types include low-loss waveguides.

In some embodiments, a sensing portion of the optical waveguide (i.e. a portion of the waveguide in the sensing region) follows a sinuous path.

In some embodiments, the method comprises delivering the light from a light source into a second waveguide that is optically coupled to the ring resonator.

In some embodiments, monitoring the intensity of the light comprises monitoring the intensity of the light in the ring resonator.

In some embodiments, monitoring the intensity of the light comprises monitoring the intensity of the light at an output of the second waveguide that is optically coupled to the resonator.

In some embodiments, the ring resonator comprises a solid core waveguide.

In some embodiments, the ring resonator comprises a sub-wavelength grating waveguide.

In some embodiments, the sensing portion of the waveguide comprises a sub-wavelength grating waveguide.

In some embodiments, the phase shift portion of the waveguide comprises a solid core waveguide.

In some embodiments, the ring resonator comprises sections of low loss waveguide connected between the sensing portion of the waveguide and the phase shift portion of the waveguide.

In some embodiments, the method comprises varying a degree of optical coupling of the second waveguide and the ring resonator.

In some embodiments, the resonator is a contra-directional coupler resonator.

In some embodiments, the waveguide is part of an interferometer and monitoring the intensity of the light is performed at an output of the interferometer. For example, the interferometer may comprise a Mach-Zehnder interferometer.

In some embodiments, the interferometer comprises a sensing branch and a reference branch, the sensing region is in the sensing branch and the phase shift region is in the reference branch.

In some embodiments, the interferometer comprises a sensing branch and a reference branch, the sensing region is in the sensing branch and the phase shift region is in the sensing branch.

In some embodiments, monitoring the intensity of the light comprises coherent detection of the light.

In some embodiments, modulating the phase shift of the light effected by a phase shift portion of the waveguide comprises periodic modulation at a modulation frequency of at least 60 Hz or at least 300 Hz or at least 1 kHz or at least 10 kHz or at least 50 kHz.

In some embodiments, the periodic modulation comprises sawtooth, triangular, or sinusoidal modulation.

In some embodiments the modulation is performed by pulse modulation (e.g. pulse width modulation, pulse frequency modulation and/or pulse density modulation).

In some embodiments, monitoring the intensity of the light comprises lock-in detection of the intensity of the light.

In some embodiments, the method comprises switching the light upstream of a light detector according to a signal Vch1(t) and mixing a second signal Vch2(t) with an output of the light detector. Vch1(t) and Vch2(t) may be the same signal.

In some embodiments, modulating the phase shift is periodic with a first frequency and Vch1(t) and Vch2(t) have frequencies significantly greater than the first frequency.

In some embodiments, the sensor portion of the waveguide is functionalized to analyze for the at least one analyte. Any suitable functionalization chemistry may be used.

In some embodiments, the sensor portion of the waveguide is functionalized to selectively bind to the at least one analyte.

In some embodiments, the method comprises allowing the at least one analyte to interact with the waveguide and monitoring changes in the intensity of the light relative to the phase shift of the light effected by the phase shift portion of the waveguide during a period while the at least one analyte is interacting with the waveguide.

In some embodiments, allowing the at least one analyte to interact with the waveguide comprises allowing the at least one analyte to bind to the waveguide.

In some embodiments, the method comprises processing the intensity of the light relative to the phase shift of the light effected by the phase shift portion of the waveguide to yield an estimated concentration for the at least one analyte.

In some embodiments, the sensing portion of the optical waveguide is part of a first one of a plurality of sensors connected in a cascade and the method comprises using an optical detector common to the plurality of sensors to monitor the intensity of the light relative to a corresponding phase shift of the light effected by the corresponding phase shift portion of the waveguide for each of the plurality of sensors.

In some embodiments, the method further comprises elevating a temperature of the sensor region. The method may comprise maintaining the sensor region at the elevated temperature while performing the monitoring of the intensity of the light relative to the phase shift of the light effected by the phase shift portion of the waveguide and/or varying the temperature of the sensor region while performing the monitoring of the intensity of the light relative to the phase shift of the light effected by the phase shift portion of the waveguide. Some embodiments comprise adjusting the modulating of the phase shift of the light effected by the phase shift portion of the waveguide to compensate for a phase shift resulting from varying the temperature of the sensor region.

In some embodiments, the method comprises processing the monitored intensity of the light relative to the phase shift of the light effected by the phase shift portion of the waveguide to determine a concentration of the at least one analyte in the sensing region.

Another aspect of the invention provides apparatuses for monitoring a sample for at least one analyte. The apparatuses comprise an optical waveguide comprising a sensing portion and a phase shift portion wherein the sensing portion passes through a volume for receiving the sample and a fixed wavelength light source coupled to deliver fixed wavelength light into the waveguide. The fixed wavelength light source may, for example comprise a laser. In some embodiments the laser and waveguide are both part of an integrated photonic platform. The apparatus comprises a phase shift modulator operative to periodically modulate a phase shift of the light effected by the phase shift portion of the optical waveguide; and at least one light detector operable to monitor an intensity of the light relative to the phase shift of the light effected by the phase shift portion of the waveguide.

In some embodiments, the phase shift modulator comprises a heater located to selectively heat the phase shift portion of the waveguide.

In some embodiments, the heater comprises an electrical resistance heater.

In some embodiments, the electrical resistance heater is covered by an oxide layer. In some embodiments, the electrical resistance heater and the phase shift portion of the waveguide are both covered by the oxide layer. In some embodiments, the heater comprises a metallic electrical conductor and/or a doped semiconductor.

In some embodiments, the heater comprises an electrical current source connected to pass an electrical current through the phase shift portion of the waveguide. The phase shift portion of the waveguide may comprise doped silicon.

In some embodiments, the phase shift portion of the waveguide comprises an IPRH device.

In some embodiments, the heater is operable to sweep a temperature of the phase shift region of the waveguide through a temperature range spanning at least 10 C or at least 25 C or at least 50 C or at least 70 C or at least 80 C. This may be done, for example, at a frequency of at least 100 Hz. Lower or higher frequencies are possible.

In some embodiments, the phase shift modulator comprises a PIN junction integrated with the phase shift portion of the waveguide.

In some embodiments, the phase shift modulator comprises a PN junction integrated with the phase shift portion of the waveguide.

In some embodiments, the phase shift modulator comprises means for applying an electric field to the phase shift portion of the waveguide wherein the phase shift portion of the waveguide comprises a material for which an index of refraction changes in response to a magnitude of the electric field.

In some embodiments, the phase shift portion of the waveguide comprises lithium niobate.

In some embodiments, the phase shift modulator comprises a polymer phase modulator that is incorporated into the phase shift portion of the waveguide.

In some embodiments, the phase shift modulator comprises an electrical control circuit connected to apply a control input that causes a phase shift effected by the phase shift modulator to periodically vary over a range of at least $\pi$ radians.

In some embodiments, the control input causes the phase shift effected by the phase shift modulator to periodically vary over a range of at least $2\pi$ radians.

In some embodiments, the control input causes the phase shift effected by the phase shift modulator to periodically vary over a range of at least $M\pi$ radians where M is an integer that is equal to or greater than 3.

In some embodiments, the waveguide comprises an optical resonator.

In some embodiments, the phase shift modulator is configured to cause the resonator to repeatedly pass through at least one resonance.

In some embodiments, the phase shift modulator is configured to cause the resonator to repeatedly pass through a plurality of resonances.

In some embodiments, the resonator is a closed loop resonator.

In some embodiments, the resonator comprises a ring resonator.

In some embodiments, the resonator comprises a ring resonator or a racetrack resonator.

In some embodiments, the resonator comprises a contra-directional coupler resonator.

In some embodiments, the resonator comprises a cavity resonator.

In some embodiments, the cavity resonator comprises a Fabry-Perot cavity resonator, a 1 D or 2 D photonic crystal cavity resonator.

In some embodiments, the resonator comprises a Bragg grating resonator.

In some embodiments, the resonator comprises a plurality of sections of the waveguide connected to form a closed loop and different ones of the sections of the waveguide comprise different waveguide types.

In some embodiments, the different waveguide types include solid core waveguide and sub-wavelength grating waveguide.

In some embodiments, the different waveguide types include low-loss waveguide.

In some embodiments, the sensing portion of the optical waveguide follows a sinuous path.

In some embodiments, the light source is coupled to deliver the light into a second waveguide that is optically coupled to the ring resonator.

In some embodiments, the at least one light detector comprises a light detector connected to monitor the intensity of the light at an output of the second waveguide.

In some embodiments, the ring resonator is optically coupled to the second waveguide by a variable coupler.

In some embodiments, the variable coupler is a directional coupler.

In some embodiments, the at least one light detector comprises a light detector operative to monitor the intensity of the light inside the ring resonator.

In some embodiments, the ring resonator is one of a plurality of ring resonators optically coupled to the second waveguide.

In some embodiments, the plurality of resonators have different resonant frequencies.

In some embodiments, the ring resonator comprises a solid core waveguide.

In some embodiments, the ring resonator comprises a sub-wavelength grating waveguide.

In some embodiments, the sensing portion of the waveguide comprises a sub-wavelength grating waveguide.

In some embodiments, the phase shift portion of the waveguide comprises a solid core waveguide.

In some embodiments, the ring resonator comprises sections of low loss waveguide connected between the sensing portion of the waveguide and the phase shift portion of the waveguide.

In some embodiments, the resonator is a contra-directional coupler resonator.

In some embodiments, the waveguide is part of an interferometer and the light detector is connected to monitor the intensity of the light at an output of the interferometer.

In some embodiments, the interferometer comprises a Mach-Zehnder interferometer.

In some embodiments, the interferometer comprises a sensing branch and a reference branch, the sensing region is in the sensing branch and the phase shift region is in the reference branch.

In some embodiments, the interferometer comprises a sensing branch and a reference branch, the sensing region is in the sensing branch and the phase shift region is in the sensing branch.

In some embodiments, the light detector comprises a coherent light detector.

In some embodiments, the phase shift modulator is configured to modulate the phase shift of the light effected by the phase shift modulator at a modulation frequency of at least 60 Hz or at least 300 Hz or at least 700 Hz or at least 1 kHz or at least 50 kHz.

In some embodiments, the phase shift modulator is configured to modulate the phase shift by sawtooth, triangular, or sinusoidal modulation.

In some embodiments, the apparatus comprises a lock-in detection system, the lock in detection system comprising electronics configured to generate a lock-in signal $Vch2(t)$ from a phase shift modulation control signal $Vch1(t)$, the lock-in signal having a fixed phase relationship to the phase shift modulation control signal; a mixing circuit configure to mix the lock-in signal with an output of the light detector; and an integration circuit configured to integrate an output of the mixing circuit over a plurality of cycles of the phase shift modulation control signal.

In some embodiments, the apparatus comprises an optical switch upstream from the light detector and a lock-in control system configured to switch the optical switch according to a signal $Vch1(t)$ and the apparatus comprises a mixer connected to receive an output of the light detector and to mix a signal $Vch2(t)$ with the output of the light detector. In some embodiments, $Vch1(t)$ and $Vch2(t)$ are the same signal.

In some embodiments, the apparatus is configured to operate the phase shift modulator to modulate the phase shift with a first frequency wherein $Vch1(t)$ and $Vch2(t)$ have frequencies significantly greater than the first frequency.

In some embodiments, the sensing portion of the waveguide is functionalized to analyze for the at least one analyte.

In some embodiments, the sensing portion is functionalized to bind to the at least one analyte.

In some embodiments, the apparatus comprises a processor or circuit configured to process the intensity of the light relative to the phase shift of the light effected by the phase shift portion of the waveguide to yield an estimated concentration for the at least one analyte.

In some embodiments, the apparatus comprises a processor or circuit configured to record changes in the intensity of the light relative to the phase shift of the light effected by the phase shift portion of the waveguide during a period while the at least one analyte is binding to the waveguide.

In some embodiments, the light source comprises a laser.

In some embodiments, the waveguide is integrated on a silicon chip.

In some embodiments, the laser is supported on the silicon chip.

In some embodiments, the apparatus comprises an analysis system configured to record an output of the light detector and to process the output of the light detector to identify a resonance wavelength of one or more sensors.

In some embodiments, the analysis system is operative to determine a concentration of one or more analytes in the sample.

In some embodiments, the apparatus further comprises a heater associated with the sensor region and operable to selectively elevate a temperature of the sensor region.

In some embodiments, the apparatus comprises a control system configured to maintain the sensor region at the elevated temperature the intensity of the light relative to the phase shift of the light effected by the phase shift portion of the waveguide.

In some embodiments, the apparatus comprises a control system configured to control the heater associated with the sensor region to vary the temperature of the sensor region while monitoring light intensity by the light detector.

In some embodiments, the control system is configured to adjust modulation of the phase shift by the phase shift modulator to compensate for a phase shift resulting from varying the temperature of the sensor region.

In some embodiments, the apparatus comprises a processor configured to process data output by the light detector to determine a concentration of the at least one analyte in the sensing region.

Another aspect of the invention provides apparatus having any new and inventive feature, combination of features, or sub-combination of features as described herein.

Another aspect of the invention provides methods having any new and inventive steps, acts, combination of steps and/or acts or sub-combination of steps and/or acts as described herein.

Further aspects and example embodiments are illustrated in the accompanying drawings and/or described in the following description.

It is emphasized that the invention relates to all combinations of the above features and/or aspects, even if these are recited in different claims.

BRIEF DESCRIPTION OF THE DRAWINGS

The present invention may be better understood, and its numerous objects, features, and advantages made apparent to those skilled in the art with reference to the accompanying drawings which illustrate non-limiting example embodiments of the invention.

DETAILED DESCRIPTION

Figure 1:
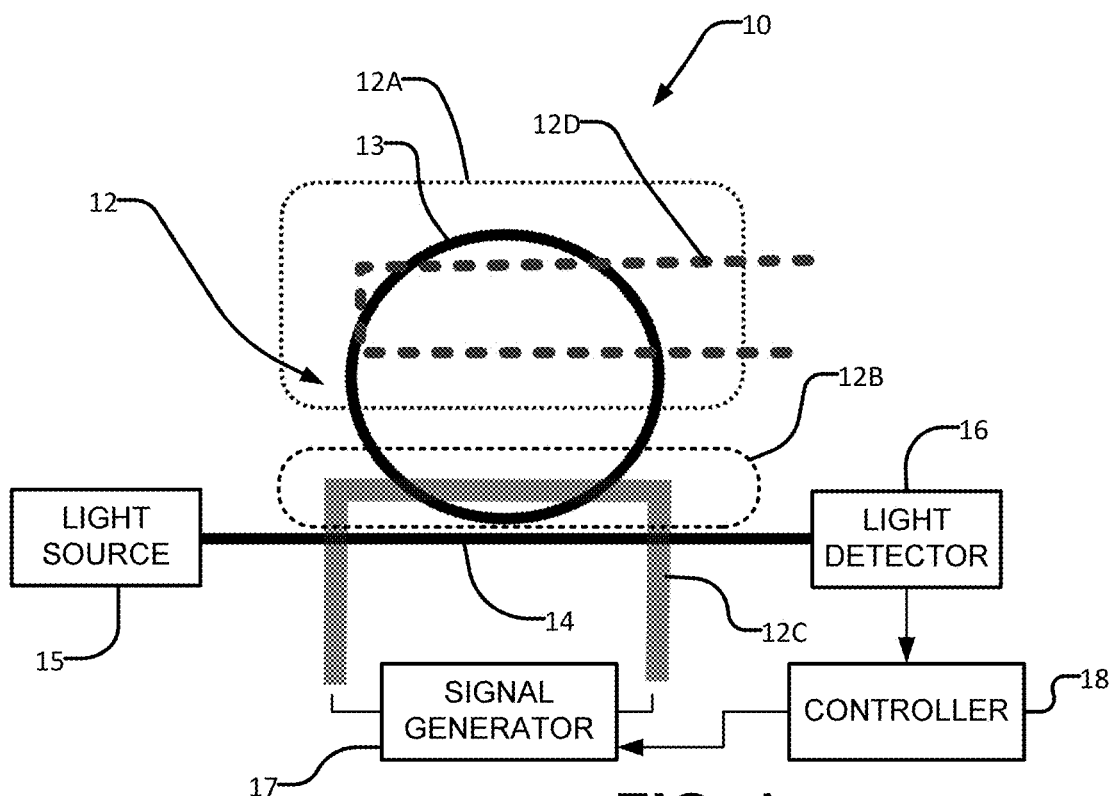
FIG. 1 is a schematic diagram illustrating an example sensor that includes a resonator having two regions, a sensor region or sensing region that may be exposed to a sample or calibration fluid and a phase shift region.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

One aspect of this invention provides evanescent wave based methods and systems for detecting analytes. The methods apply systems which include fixed wavelength light sources (e.g. lasers) connected to supply light to a sensor comprising an optical resonator or other optical structure. The systems include one or more control mechanisms or "phase modulation" or "phase shift" mechanisms operative in response to a control input to control a phase shift effected by part of the sensor, for example by controlling an effective index of refraction of light in the part of the sensor. The control input may be varied while an optical output of the system is monitored. The resulting data may be processed to yield information regarding the presence or absence of an analyte that interacts with, e.g. by binding to, a functionalized surface of the sensor. Preferably a portion of the sensor on which an analyte may be captured is separate from a portion of the sensor on which the control mechanism(s) operate.

A wide range of surface functionalizations are known in the art and may be applied in the context of the present technology. For example, functionalization may comprise materials (e.g., antibodies, aptamers, proteins, peptides, molecularly-imprinted polymers, protein-catalyzed capture agents, single-stranded DNA or RNA etc.) that are attached to the waveguide surface in a sensing region. The presence of an analyte of interest to a correspondingly functionalized waveguide yields change in an effective refractive index of the waveguide, for example through a specific binding interaction, enzymatic amplification, high contrast cleavage reaction, or other effect.

In effect, the method and systems can avoid the need for a tunable wavelength laser (expensive) by providing means for tuning the wavelength of the sensor itself, which may be much more cost-effective.

The invention may be implemented in a wide range of embodiments, some examples of which are described herein and illustrated in the accompanying drawings. Some example embodiments may comprise combinations of the following:

- A sensor comprising an optical waveguide. In some embodiments the waveguide is configured to provide an optical resonator. The optical resonator may be of any of various types including a loop-type resonator in which an optical path follows a closed loop (e.g. a ring resonator, racetrack resonator, a disk resonator, a resonator that follows a more complicated or meandering path such as the resonator illustrated in FIG. 9A, or the like), a cavity based resonator such as a Fabry-Perot cavity resonator or a 1 D or 2 D photonic crystal cavity resonator, a Bragg grating resonator, or a contra-directional coupler resonator). In some embodiments the waveguides are configured to provide an interferometer (e.g. a Mach-Zehnder Interferometer, Michelson Interferometer, or any other device that relies on interference).
- The optical waveguide of the sensor may comprise a solid core waveguide, such as a strip, rib, or ridge waveguide, or a sub-wavelength grating waveguide (e.g. a waveguide comprising a set of small optically coupled sections) or a combination thereof in which some portions of the waveguide have a solid core construction and some portions of the waveguide have a sub-wavelength construction.
- In some embodiments the control mechanism comprises a heater (which may be external to the waveguide and/or internal to the waveguide). The heater may alter the index of refraction of material in a portion of the waveguide by varying the temperature of the portion of the waveguide. In some embodiments the control mechanism operates by carrier injection in a PIN junction, carrier depletion in a PN junction, or electro-optic effect (e.g. in a lithium niobate crystal). In some embodiments the control mechanism comprises a polymer phase modulator.
- In some embodiments the optical detector is internal to the sensor. In some embodiments the optical detector is external to the sensor.
- In some embodiments one or more optical detectors and/or one or more light sources are common to a plurality of sensors.
- Light sources that emit light of different wavelengths may be used. Wavelengths may, for example, be in the infrared or visible range. Some convenient wavelengths include a band around 1310 nm (e.g. 1270 to 1330 nm). This band tends to be convenient both because water, which is a major component of many samples of potential interest (e.g. blood, saliva) has relatively low absorption in this band and also because there are practical and cost-effective lasers that emit light in this wavelength range and can be deployed on a silicon chip. Other wavelengths that may be used include wavelengths of about 1550 nm and various wavelengths of visible light.
- Light sources may be of different types such as distributed feedback (DFB) lasers.

FIG. 1 shows schematically an example apparatus 10 which includes an optical resonator 12 comprising a waveguide 13 that forms a loop. The loop may be circular as schematically illustrated in FIG. 1 or a different shape such as oval, sinuous etc. In the example embodiment shown in FIG. 1, waveguide 13 comprises a solid core waveguide. In other embodiments waveguide 13 may have a different construction or a composite construction in which different portions of resonator 12 have different constructions.

Resonator 12 has two regions, 12A and 12B. In region 12A, an area of waveguide 13 is exposed to a solution that may contain one or more analytes. For example, in region 12A waveguide 13 may project into a volume (e.g. a chamber, well, microfluidic passage or the like) into which a fluid (which may comprise a liquid and/or a gas) may be introduced for analysis. The surface of waveguide 13 in region 12A may be functionalized to bind one or more analytes of interest. For example, top and side surfaces of the portion of waveguide 13 that is within region 12A may be functionalized.

Region 12B is a phase modulation region. Phase modulation region 12B includes mechanism that can change the phase delay of light that passes through the portion of waveguide 13 in region 12B. This may be achieved for example by controlling an index of refraction of the material of waveguide 13 in region 12B. In the illustrated embodiment, apparatus 10 comprises a heater 12C which is operable to heat the material of waveguide 13 in region 12B. As noted elsewhere herein, other mechanisms may be applied to control the phase (i.e. delay or retardation) of light that passes through phase modulation region 12B.

In some embodiments, particularly where phase modulation region 12B comprises a heater, the heater and the portion of waveguide 13 in region 12B may be buried in an oxide layer. The oxide layer may help to prevent the heat from heater 12C from heating fluids in fluidic circuits that may be close to heater 12C.

Resonator 12 is optically coupled to a waveguide 14 which carries light from a light source 15 (e.g. a fixed wavelength laser) to a detector 16. The amount of the light emitted by light source 15 that reaches and is detected by light detector 16 depends significantly on how close the resonant wavelength (or frequency) of resonator 12 is to the wavelength (or frequency) of the light emitted by light source 15.

The resonant wavelength of resonator 12 is significantly affected by both: the presence of analytes in region 12A which change the effective index of refraction of waveguide 13 in region 12A (for example, by binding to the surface of waveguide 13) and thereby alter the resonant frequency of resonator 12; and also the phase (delay) that occurs when light passes through the portion of waveguide 13 in region 12B.

The phase (delay) provided by region 12B may be controlled to change slowly as typically used in tuning a circuit, or quickly, as in data communications modulators. For example, the temperature of the material of waveguide 13 in region 12B may be controlled by heater 12C to repeatedly sweep across a desired temperature range at a rate of less than 1 Hz to several kHz to 100 kHz or more. In some embodiments the rate is at least 100 Hz or at least 1 kHz or at least 50 kHz. The temperature affects the index of refraction of the material of waveguide 13 in region 12B and thereby also affects the resonant frequency of resonator 12.

The temperature required to achieve a desired phase shift modulation will depend on the material of the waveguide in phase shift region 12B as well as the length of the waveguide in phase shift region 12B. In some embodiments the temperature is swept through a range spanning at least 10 C or at least 50 C, at least 80 C or at least 100 C, for example.

The phase shift mechanism should allow the phase delay provided by region 12B to be modulated over a range of at least pi radians (one half wavelength) and preferably at least $2\pi$ radians. In some embodiments the phase shift mechanism allows the phase delay provided by region 12B to be modulated over a larger range which may include multiples of $2\pi$ radians. For example, a heater 12C may be controlled to provide a phase shift within a range that spans more than $4\pi$ or $6\pi$ radians.

Apparatus 10 may be formed on a suitable substrate (e.g. a silicon substrate), for example using known techniques for fabricating integrated silicon photonics.

Waveguides such as waveguide 13 of resonator 12 and/or waveguide 14 may, for example, be made of a material such as silicon or silicon nitride, silica etc.

In some embodiments, waveguide 13 has a cross-sectional size on the order of about 500 nm×220 nm. Waveguide 13 may, for example, have a total length in the range of a few tens of microns to millimeters long.

Heater 12C may take any of various forms including a metal heater above the waveguide, implant doping a portion of waveguide 13 (e.g. doping a portion of waveguide 13 that is made of silicon) and running an electric current through the doped portion of waveguide 13 etc.

Heater 12C may be made to have a thermal time constant of 1 ms or less (preferably well below 1 ms). This facilitates rapid wavelength sweeping (or wavelength modulation) which is advantageous for biosensing applications, especially where it is necessary to accurately and repeatedly extract peak of resonator 12.

In operation of apparatus 10, a modulation signal is applied to heater 12C by a suitable signal generator 17. The modulation signal may have any suitable form such as a saw-tooth, triangular, or sinusoidal waveform or an arbitrary waveform that covers a wide enough range or power to heater 12C to cause phase shift provided by region 12B to vary in a desired way over a desired range. This results in the optical spectrum of resonator 12 being shifted in a time varying way (the resonant wavelength of resonator 12 is swept over a range of wavelengths). In some embodiments heaters as described herein (e.g. heaters 12C and/or 12D and/or 52) are controlled by pulsed signals and the temperature is controlled by a pulse modulation technique such as one or a combination of: pulse width modulation, pulse density modulation, pulse frequency modulation or the like. By applying pulse modulation to such signals the temperature of a waveguide may be varied according to a desired waveform (e.g. a saw-tooth, triangular, or sinusoidal waveform).

When light from fixed wavelength laser 15 is passed through apparatus 10 the optical output detected at detector 16 has the form of an amplitude-modulated signal having an amplitude proportional to the resonator's transmission spectrum at the wavelength of the laser. The amplitude changes as the transmission spectrum is wavelength shifted by heater 12C. Thus, the measurement returns a proxy to the optical spectrum, where the independent wavelength variable is replaced by time in the modulation signal.

The measurement can also be performed by controlling the phase shifter (e.g. heater 12C) such that the resonant wavelength of resonator 12 matches the wavelength of light from laser 15, or is detuned by a desired amount from the wavelength of the light from laser 15. The magnitude of the control input (e.g. the current provided to drive heater 12C) may be used as an output signal in this case. The changes in the sensor's resonance frequency will lead to a spectral shift which gets translated into a change in amplitude of the output signal from detector 16. This may be used as a feedback signal to control the phase shifter.

A controller 18 may have functions such as controlling the operation of apparatus 10, acquiring data from detector 16 and/or processing the acquired data to yield information such as the concentration of one or more analytes. In some embodiments one controller 18 controls and/or processes data from two or more apparatus 10 which may be on the same or different substrates.

It is desirable for region 12B to be thermally isolated from region 12A to avoid thermal cross-talk. In particular it is desirable to avoid heating sensor region 12A which could cause evaporation of a liquid being tested, changes in the analyte chemistry (denaturing proteins), etc. Thermal isolation between regions 12A, 12B may be achieved by physically separating and/or distancing heater 12C from region 12A. Thermal isolation may be improved by configuring all or part of waveguide 13 as a sub-wavelength waveguide.

Figure 2:
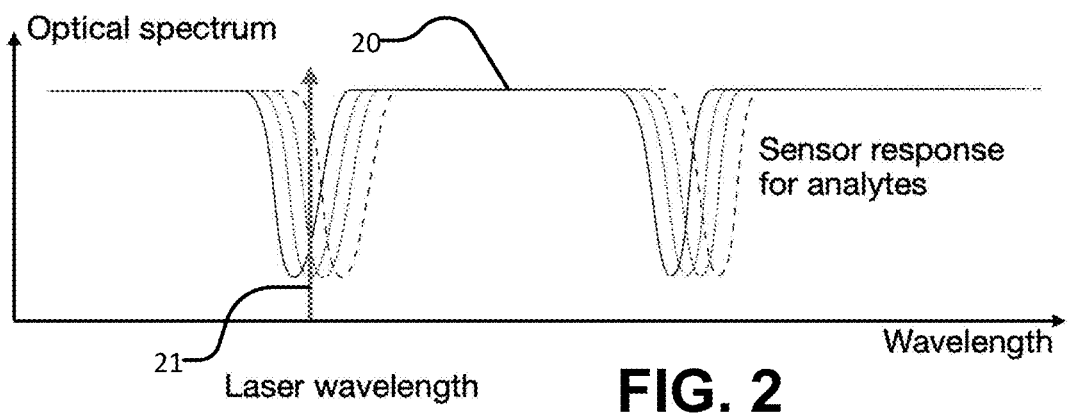
FIG. 2 is a graph showing an example optical transmission spectrum for a resonant sensor as a function of wavelength.

FIG. 2 shows a set of curves 20 which represents the optical transmission spectrum of a resonant sensor (e.g. apparatus 10) as a function of wavelength. Several example curves are shown for different concentrations of analytes bound to the surface of waveguide 13 in region 12A.

One way to obtain curves like curves 20 shown in FIG. 2 would be to use a light source 15 that is controllable to sweep the wavelength of light emitted into waveguide 14 and monitor the output from detector 16 as a function of the wavelength of light. As pointed out above, this is undesirable because variable wavelength lasers tend to be both expensive and inconveniently large.

Figure 3:
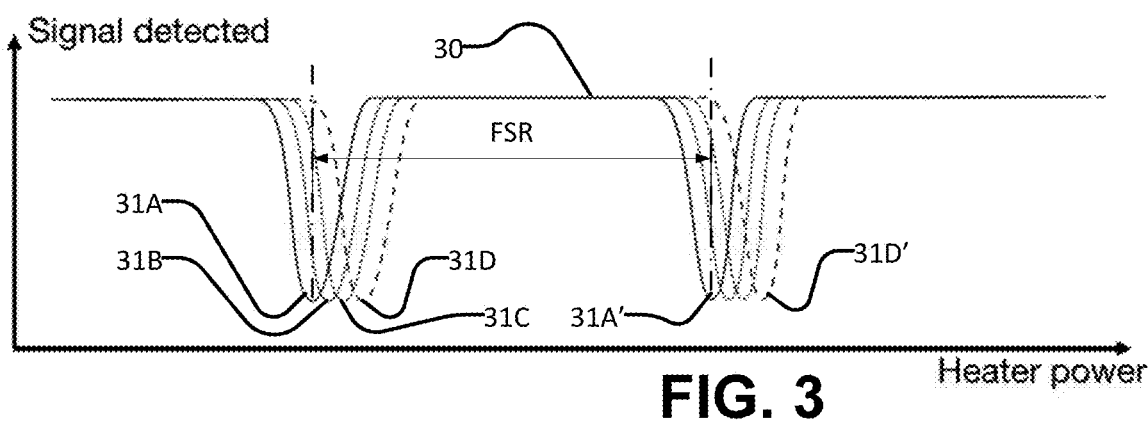
FIG. 3 is a graph showing an example output of an optical detector of some example embodiments as a function of a phase shift control input such as heater power.

As illustrated in FIG. 3, it is possible to obtain a curves 30 which contain information similar to the information content of curves 20 by using a fixed wavelength light source (e.g. a light source having a wavelength 21 (see FIG. 2)) and varying a phase delay provided by the portion of waveguide 13 in region 12B (e.g. by heating with heater 12C).

The location of peak 31 of curve 30 is shifted depending on the concentration of an analyte in region 12A. FIG. 3 shows peak 31A corresponding to no analyte present and peaks 31B, 31C and 31D which correspond to increasing concentrations of analyte.

The concentration of an analyte may be determined by detecting when a peak 31 occurs relative to cycles of the waveform driving heater 12C (more generally, cycles of modulation of the phase shift applied to light as it passes through region 12B).

The phase shift modulator (whether heater 12C or another mechanism) is controllable to modulate the phase shift provided in phase shift region 12B over a range. Preferably the range of modulation of the phase shift provided by phase shift region 12B is at least $2\pi$ radians (which corresponds to the free spectral range ("FSR") of resonator 12) since this ensures that the range of modulation will include at least one instance of any particular peak (e.g. 31A, 31B, 31C, 31D). In some embodiments the range of the phase shift modulator is sufficient to permit both small shifts and shifts of up to several times the FSR.

FIG. 3 also shows that if the modulation of the phase has a large enough range then the same peak 31 may be encountered multiple times with different instances of peak 31 separated by phase shifts of $2\pi$ radians. FIG. 3 shows, for example, peaks 31A' and 31D' which correspond respectively to peaks 31A and 31D.

Figure 4:
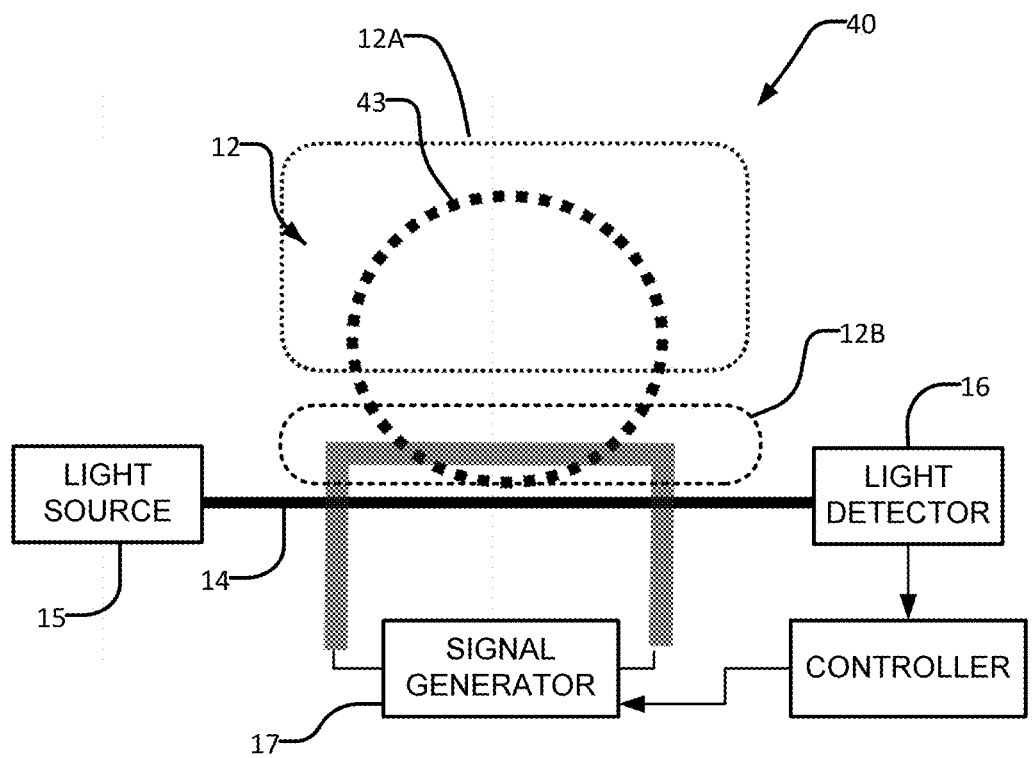
FIG. 4 is a schematic diagram illustrating an example sensor that is like the sensor of FIG. 1 except that the sensor of FIG. 4 is based on sub-wavelength grating materials.

FIG. 4 shows another example apparatus 40 which is similar to apparatus 10 except that waveguide 13 has been replaced with a sub-wavelength light guide 43. A subwavelength light guide is a waveguide that is divided into small segments having a scale substantially smaller than the wavelength of light propagating in the waveguide (e.g. substantially smaller than the wavelength of the light emitted by light source 15). Sub-wavelength waveguides are described for example in Robert Halir et al. *Waveguide sub-wavelength structures: a review of principles and applications* Laser Photonics Rev. 9, No. 1, 25-49 (2015)/DOI 10.1002/lpor.201400083 and in Han Yun et al., *Broadband 2×2 adiabatic 3 dB coupler using silicon-on-insulator sub-wavelength grating waveguides* Optics Letters Vol. 41, Issue 13, pp. 3041-3044 (2016) https://doi.org/10.1364/OL.41.003041.

The construction of subwavelength light guide 43 reduces thermal crosstalk between the portion of waveguide 43 in region 12B and the portion of waveguide 43 in region 12A. The use of sub-wavelength materials may also increase sensitivity of apparatus 40 (e.g. by providing increased surface area for functionalization). In some embodiments the sub-wavelength grating waveguide is a "fishbone" type in which the small waveguide segments are connected by a narrow spine.

Figure 5:
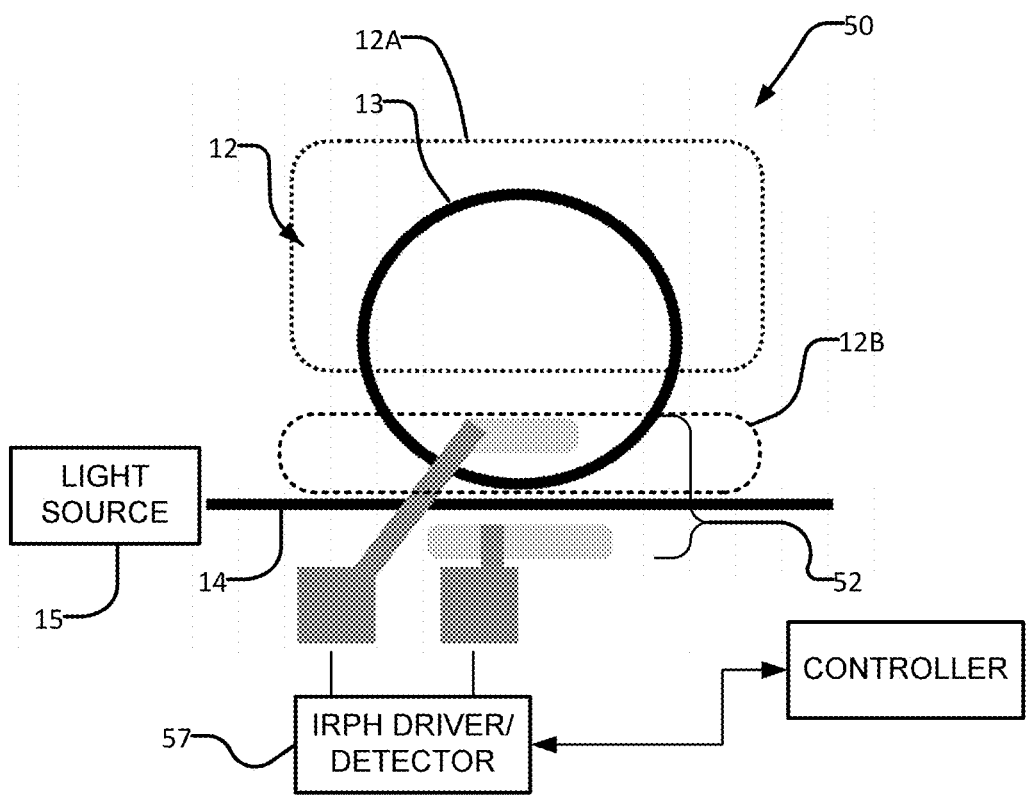
FIG. 5 is a schematic diagram illustrating an example sensor that is like the sensor of FIG. 1 except that it includes an in-resonator photoconductive heater (IRPH), which acts as a heater and can also act as a light detector.

FIG. 5 shows an example apparatus 50 which is similar to apparatus 10 of FIG. 1 except that heater 12C is shown to be an in-resonator photoconductive heater (IRPH) 52 and signal generator 17 is replaced with a circuit 57 that is configured to drive IRPH 52 and to detect a signal representing optical power measured by IRPH 52.

IRPHs are described, for example, in: Hasitha Jayatilleka et al., *Wavelength tuning and stabilization of microring-based filters using silicon in-resonator photoconductive heaters* Optics Express Vol. 23, Issue 19, pp. 25084-25097 (2015) https://doi.org/10.1364/OE.23.02508452. and in Sahba Talebi Fard, et al., *Silicon-on-insulator sensors using integrated resonance-enhanced defect-mediated photodetectors* Optics Express Vol. 22, Issue 23, pp. 28517-28529 (2014) https://doi.org/10.1364/OE.22.028517.

An IRPH can be applied to act as either or both of a heater and a light detector. In some embodiments an IPRH is applied as both a heater and a light detector. An IRPH enables the direct detection of optical power within resonator 12. The resonant frequency of resonator 12 may be determined as being at a maximum of the detected power. Since IRPH 52 can act as an optical detector, an optical detector 16 is not required in apparatus 50.

In any embodiments of the present technology IPRH 52 may be implemented in various ways. For example, IPRH 52 may be based on any of: a n+, n, n+ device; a p+, p, p+ device; a p, i, n device; or a reverse-biased PN junction. Electrical current flow at the IPRH may be transverse to waveguide 13 but this is not necessary. An IPRH may have any other orientation relative to waveguide 13 that is practical in the circumstances of a particular embodiment. Also, while an IPRH device may be located at a coupling region (e.g. a region where light is coupled between a waveguide 14 and a resonator 12, this is not mandatory, in any embodiment described herein an IPRH may have other positions along a resonator 12. Locating and IPRH 52 at or near a coupling region can be convenient for facilitating physical separation between phase shift region 12B which may include the IPRH 52 and a sensing region 12A of the resonator.

Figure 6:
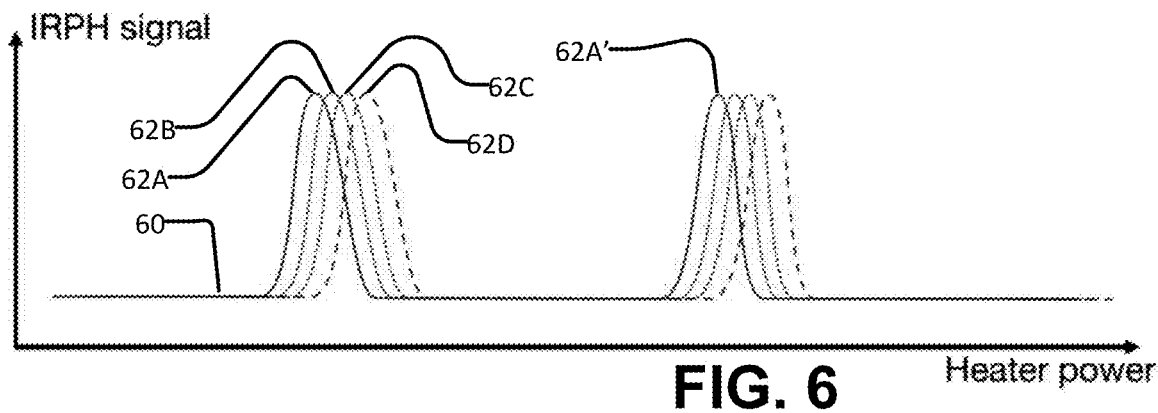
FIG. 6 is a graph illustrating an example of an electrical signal measured by an IRPH detector as a function of heater power.

FIG. 6 shows example electrical signals measured by IRPH 52 as a function of IRPH heater power. The electrical signals represent optical power in resonator 12 for different concentrations of an analyte.

In operation, the voltage (or current) supplied to IRPH 52 is modulated. The electrical current passing through IRPH 52 causes heating, thereby modulating the phase and modulating the resonant frequency of resonator 12. The change in the current (or voltage) is related to the intensity of the light in resonator 12, which is detected by IRPH 52. Thus, IRPH 52 returns an output that may be used as a proxy for the optical spectrum, where the independent wavelength variable is replaced by the heater power, which is modulated in time.

FIG. 6 shows four example curves 60. A first curve 60 corresponding to no analyte concentration includes peaks 60A and 60A'. Other curves 60 respectively include peaks 60B, 60C and 60D which respectively correspond to increasing analyte concentrations as well as other corresponding peaks at heater power levels corresponding to phase shifts of multiples of $2\pi$.

Figure 7:
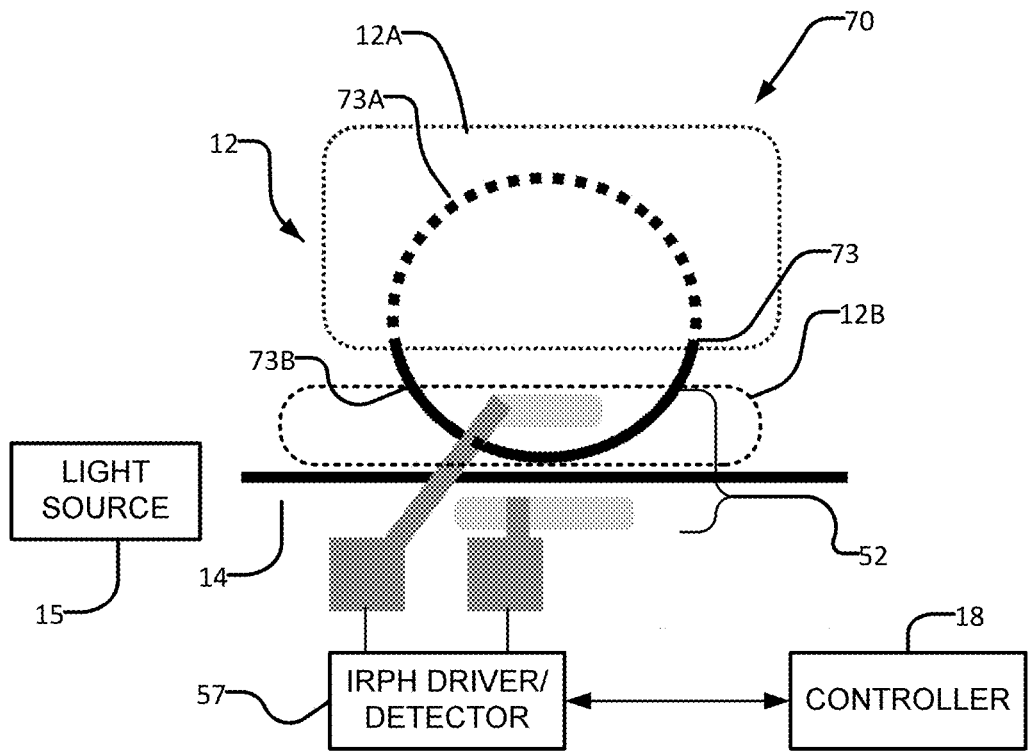
FIG. 7 is a schematic diagram illustrating an example sensor that is like the sensor of FIG. 5, except that in the sensor region the waveguide is provided by a sub-wavelength grating waveguide.

FIG. 7 shows example apparatus 70 that is similar to apparatus 50 of FIG. 5 except that solid core waveguide 13 is replaced by a waveguide 73 that includes a sub-wavelength material part 73A and a solid core part 73B. Sub-wavelength part 73A extends through region 12A and solid core part 73B is provided at least in the part of waveguide 73 that includes IRPH 52. Waveguide converters may be provided where parts 73A and 73B connect to one another.

Figure 7A:
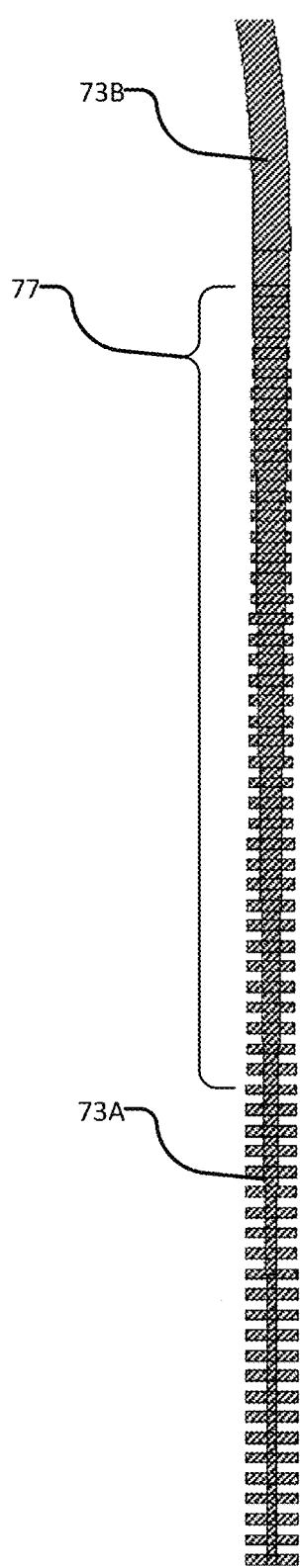
FIG. 7A shows an example transition region between a section of solid core waveguide and a section of sub-wavelength grating waveguide.

FIG. 7A shows an example transition region 77 which serves as a waveguide converter. Waveguide converters are described for example in: Han Yun et al. (cited above). The use of sub-wavelength materials for the part of waveguide 73 that is in contact with a fluid to be tested for analyte(s) of interest increases the sensitivity of apparatus 70, and provides improved thermal isolation between regions 12A and 12B.

Figure 8:
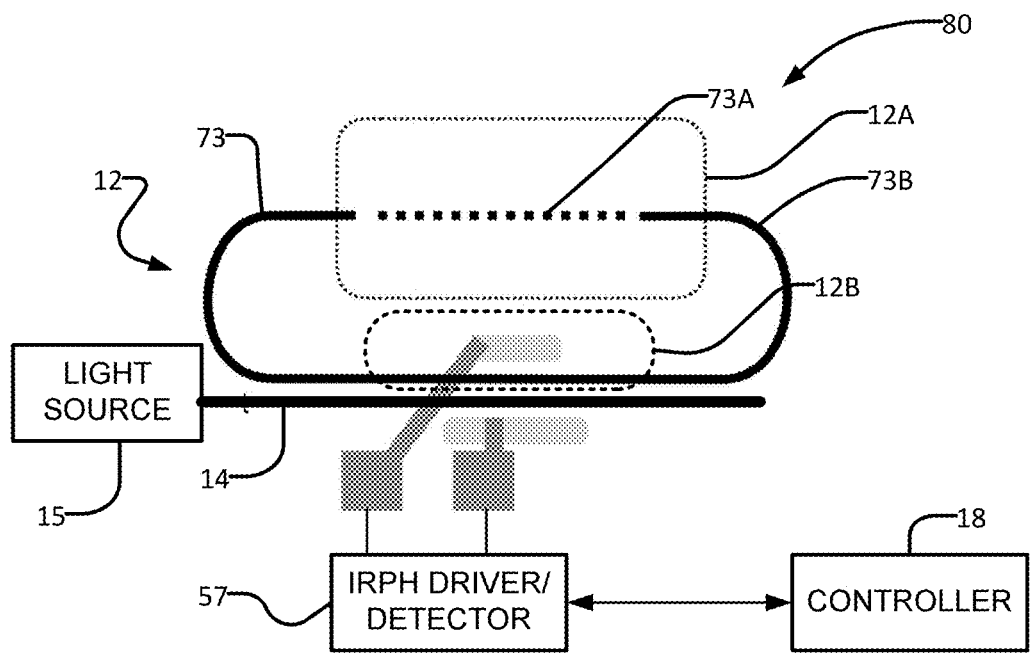
FIG. 8 is a schematic diagram illustrating an example sensor that is like the sensor of FIG. 7, except that the sub-wavelength waveguide is arranged to be straight rather than curved, which reduces optical losses.

FIG. 8 shows an example apparatus 80 which is the same as apparatus 70 except that the shape of resonator 12 has been altered so that sub-wavelength waveguide part 73A is straight rather than curved. This construction reduces optical losses.

Figure 9:
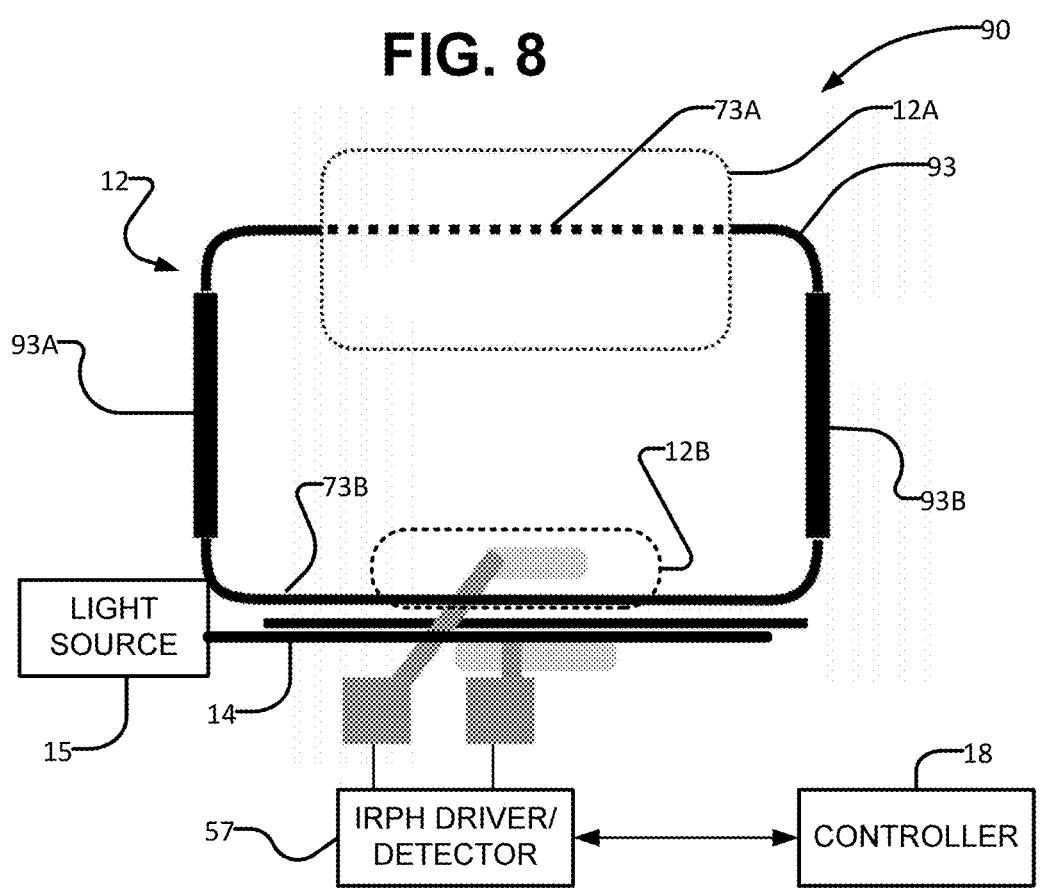
FIG. 9 is a schematic diagram illustrating an example sensor in which the sensing region and the phase shift region are physically separated using low-loss waveguides.

FIG. 9 shows an example apparatus 90 which is similar to apparatus 80 except that waveguide 73 has been replaced by a waveguide 93 that include low loss waveguide portions 93A and 93B that connect waveguide portions 73A and 73B. This construction can provide increased physical separation between region 12A and region 12B. Separating region 12A which senses an analyte from region 12B which is heated to tune the resonant frequency of resonator 12 has the advantage of reducing or eliminating thermal heating of sensing region 12A (thermal crosstalk). Heater region 12B can be in a location that is not in proximity to the analyte, thereby reducing heating effects on the analyte.

Figure 9A:
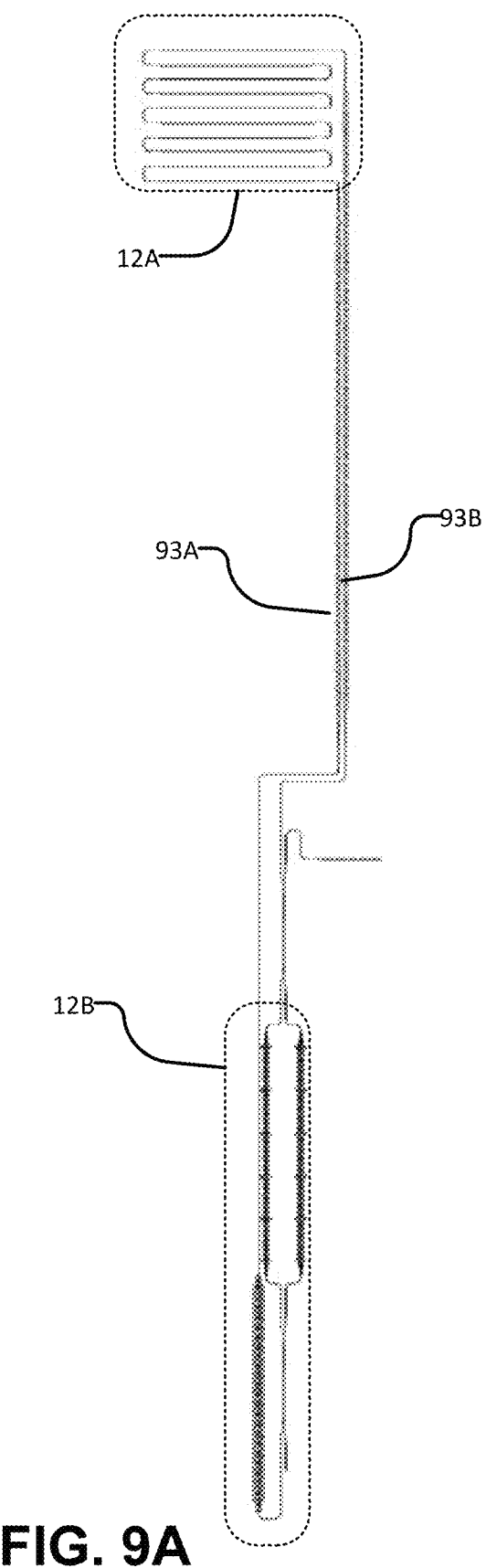
FIG. 9A is an example layout for a ring resonator sensor in which a sensing region and a phase modulator system are physically separated from one another.

FIG. 9A shows an example layout for a resonator of the general type illustrated in FIG. 9 in which a sensing region 12A is separated from a phase modulation region 12B by a relatively large distance. Low-loss waveguides 93A and 93B connect parts of the structure associated with region 12A and parts of the structure in region 12B that are associated with phase modulation and light detection.

The addition of low-loss waveguide portions 93A and 93B may increase the total length of resonator 12. This will decrease the free spectral range. However, because the quality factor Q is increased while the FSR is simultaneously decreased, the net result is that the Finesse remains approximately constant. Therefore, the sensitivity may be reduced, but the linewidth of resonator 12 can correspondingly also be reduced. This means that the same limit of detection may be achieved, but with the advantage of thermal isolation.

Low-loss waveguide portions 93A, 93B may, for example, be implemented using a wide waveguide as described for example in Miguel Á. Guillén-Torres, et al. *Effects of backscattering in high-Q, large-area silicon-on-insulator ring resonators* Optics Letters Vol. 41, Issue 7, pp. 1538-1541 (2016) https://doi.org/10.1364/OL.41.001538 and/or by making low loss waveguide portions 93A, 93B of a low-loss material such as silicon nitride.

An advantage of including low-loss waveguides in resonator 12 is that doing so can increase the quality factor (Q) of resonator 12 as described for example in Miguel Á. Guillén-Torres, et al. (cited above). If it is desired to increase the sensitivity of the apparatus described herein (with "sensitivity" defined as the change in the resonant wavelength versus the change in concentration of an analyte of interest) one can both increase the length of the part of resonator 12 that senses the analyte of interest and also increase the quality factor Q of resonator 12, for example by using low-loss materials and construction for resonator 12.

Figure 10:
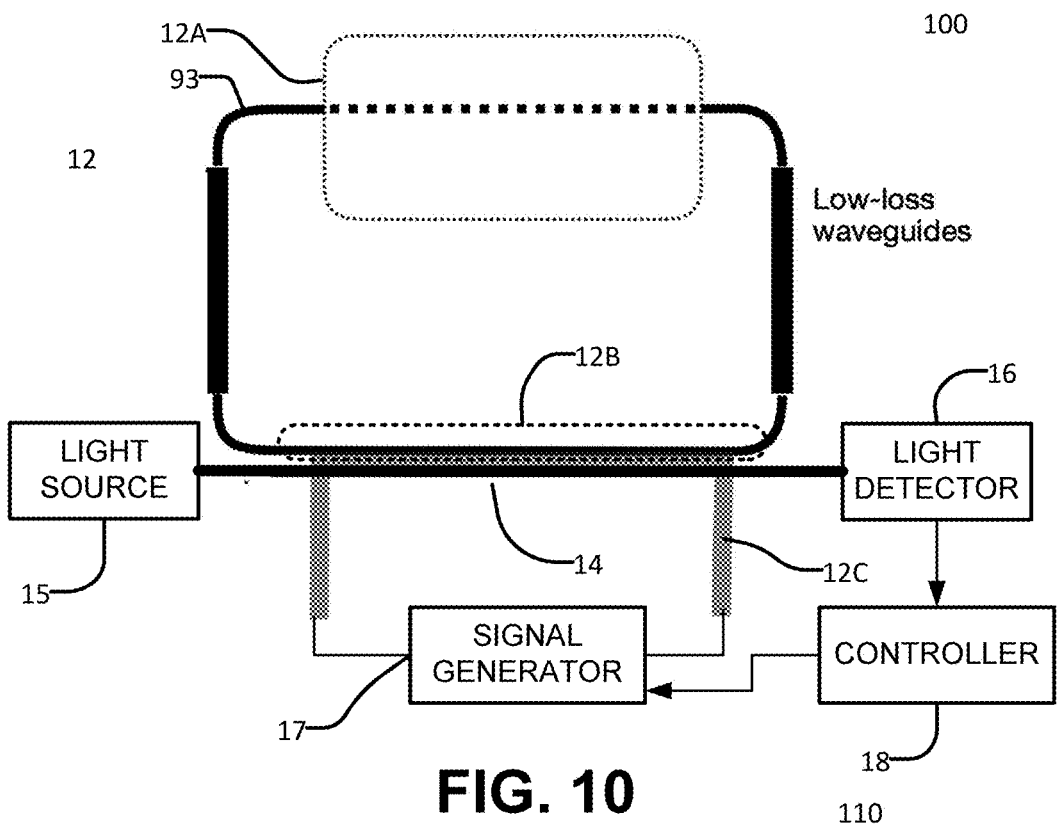
FIG. 10 is a schematic diagram illustrating an example sensor that is like the sensor of FIG. 9, except that a heater and separate detector are provided in place of the IRPH of FIG. 9.

FIG. 10 shows an apparatus 100 that is similar to apparatus 90 except that instead of an IRPH it includes a heater external to resonator 12.

Figure 11:
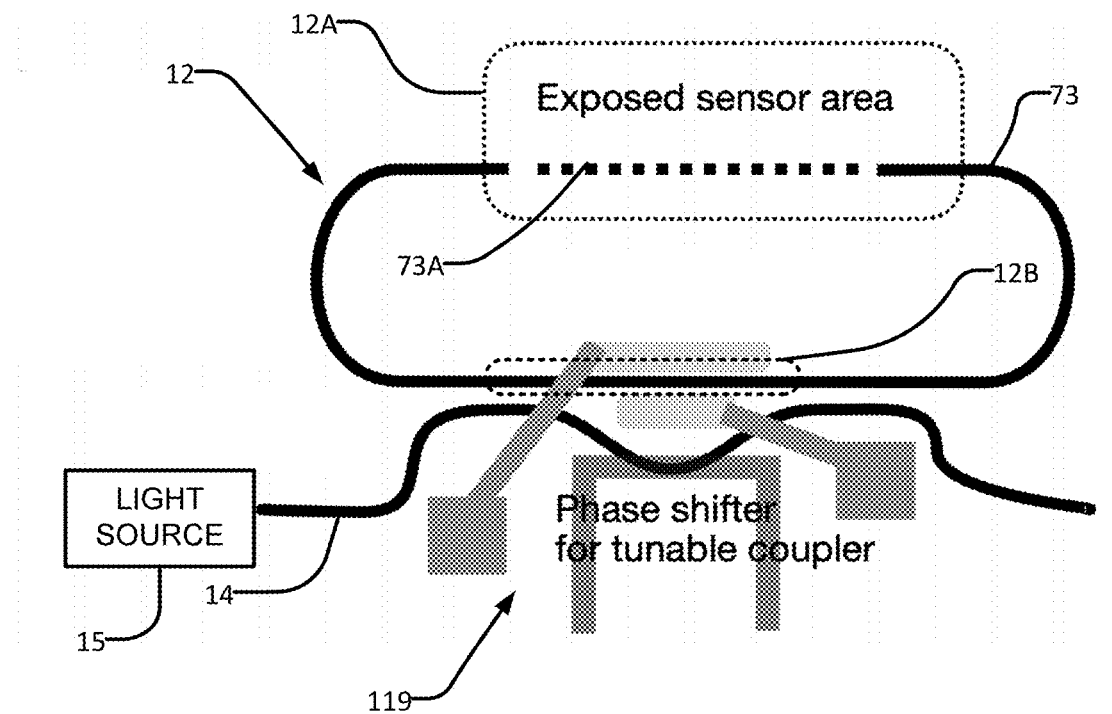
FIG. 11 is a schematic diagram illustrating an example sensor that includes a tunable coupler to allow adjustment of a coupling coefficient to a ring resonator. In this example the coupler is a thermally tunable directional coupler based on a Mach-Zehnder interferometer.

FIG. 11 shows example apparatus 110 that is similar to apparatus 80 of FIG. 8, except that apparatus 110 includes a tunable directional optical coupler 119 between waveguide 14 and resonator 12. Directional coupler 119 may, for example be based on a Mach-Zehnder interferometer. Directional coupler 119 may, for example be thermally adjustable. Directional coupler 119 permits adjustment of the coupling coefficient between waveguide 14 and resonator 12. This is especially useful when the losses due to fabrication or due to the analyte are unknown a-priori. Such losses may be accounted for during the measurement. A variable directional coupler 119 may be used together with other resonators as described herein. For example in apparatus of the types illustrated in any of FIG. 1, 4, 5, 7, 8 or 9.

Figure 12:
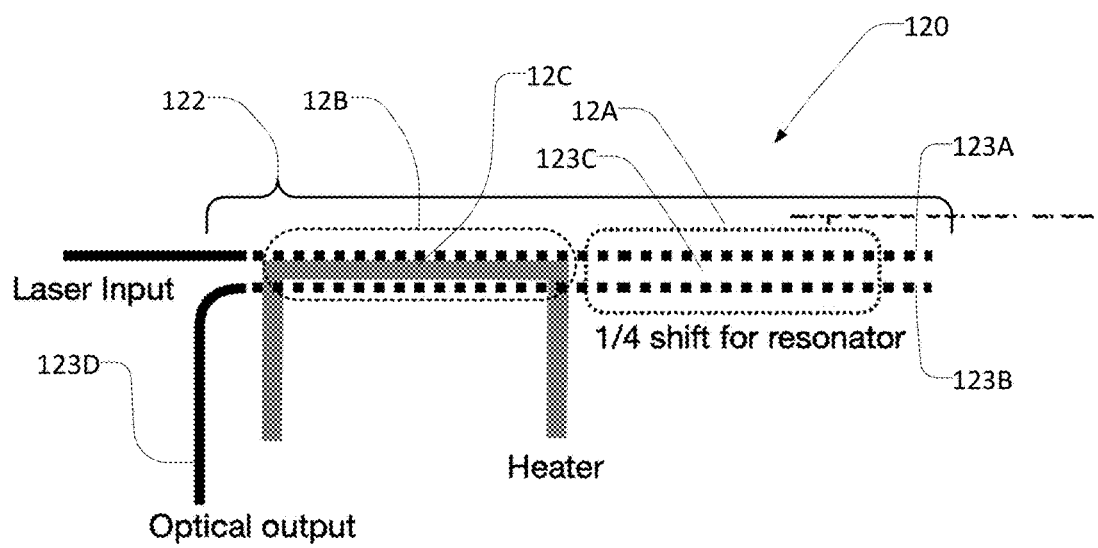
FIG. 12 is a schematic diagram illustrating an example sensor according to an embodiment that comprises a contra-directional coupler resonator.

FIG. 12 shows example apparatus 120 which is similar to apparatus 40 except that resonator 12 is replaced with a contra-directional coupler (CDC) 122. CDCs are described for example in: Wei Shi, et al. *Silicon photonic grating-assisted, contra-directional couplers* Optics Express Vol. 21, Issue 3, pp. 3633-3650 (2013) https://doi.org/10.1364/OE.21.003633. CDC 122 incudes first and second waveguides 123A and 123B optically connected by a grating 123C. In apparatus 120 a shift in grating 123C creates a resonator. A portion 12A of the resonator is functionalized and exposed to a fluid that may contain an analyte of interest. A separate portion 12B of the resonator is located to receive heat from a heater 12C.

As in other embodiments, the intensity of light present in an optical output 123D, in this case waveguide 123B, has a functional relationship to a concentration of an analyte of interest that is captured in portion 12A. Two or more of apparatus 120 may be cascaded (e.g. connected in series).

CDC 122 may be made with solid-core waveguides, or sub-wavelength grating waveguides.

Figure 13:
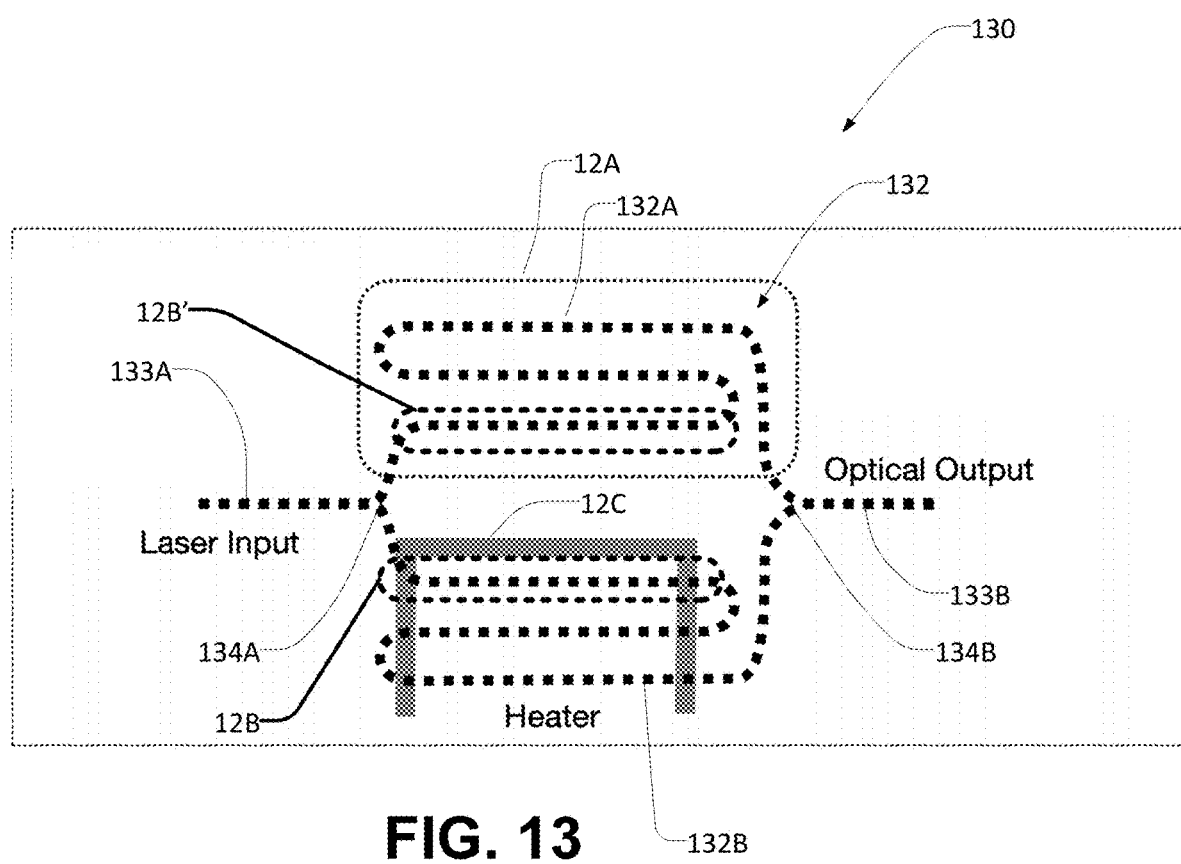
FIG. 13 is a schematic diagram illustrating an example sensor according to an embodiment that comprises an interferometer (Mach Zehnder). One branch includes a sensor region and another branch includes a phase shift region.

FIG. 13 schematically illustrates another example apparatus 130 that is operable to detect an analyte of interest. Apparatus 130 is based on an interferometric principle. Apparatus 130 comprises an interferometer 132 (in this example a Mach Zehnder interferometer). Interferometer 132 includes optical waveguides arranged to provide a sensor branch 132A and a reference branch 132B. Coherent light incident at an input 133A is split at 134A into branches 132A and 132B. Light from branches 132A and 132B is recombined at 134B. The recombined light interferes and is carried to output 133B.

Sensor branch 132A includes a region 12A in which the waveguide of sensor branch 132A is functionalized and exposed to a sample. Reference branch 132B includes a phase modulation region 12B in which the waveguide of reference branch 132B is controllably heated by a heater 12C.

The light output at output 133B depends on the relative optical path lengths of sensor branch 132A and reference branch 132B. The optical path length of sensor branch 132A is affected by the presence and concentration of an analyte of interest in region 12A. The optical path length of reference branch 132B is affected by the temperature of the waveguide in region 12B. By varying the temperature in region 12B using heater 12C one can sweep the optical path length of reference branch 132B such that the variation of light output at 133B with temperature in region 12B (or equivalently with the output of heater 12C) provides a signal that contains information regarding the presence and concentration of an analyte of interest in region 12A.

Apparatus 130 may be varied in many ways, for example, by placing phase modulation region 12B and sample region 12A in the same branch (e.g. a phase modulation region may be provided at location 12B' in branch 132A. Other example variations include different constructions for phase modulation region 12 as described herein, different constructions for waveguides etc. In some embodiments branches 132A and 132B are routed such that regions 12A and 12B are physically separated by a relatively large distance. This may have the effect of reducing thermal crosstalk between region 12B and other parts of apparatus 130. For example a heater may be placed in a region that is not in proximity to analyte, thereby reducing heating effects on the analyte.

Apparatus according to the present invention may combine plural sensors. Different ones of the plural sensors may, for example, may be configured to detect different analytes (e.g. by providing different functionalization in region 12A). In some embodiments, one or more of the plural sensors is configured to detect reference analyte(s) or no analytes at all. Such sensors may be used for calibration of the apparatus (e.g. to take account of factors such as ambient temperature, dilution of samples, common-mode noise, etc.).

Figure 14:
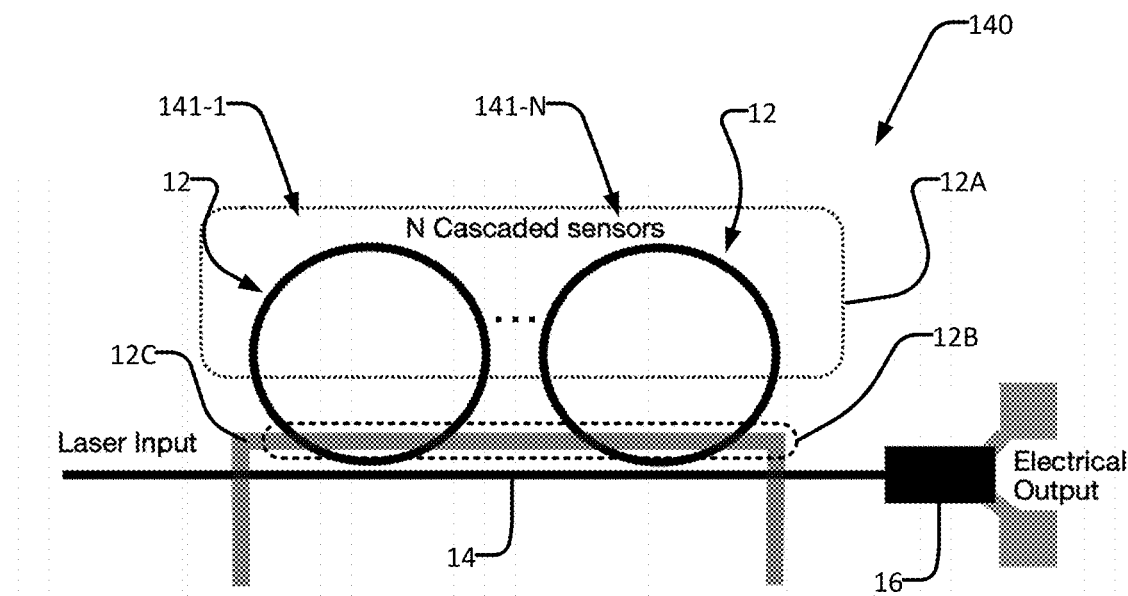
FIG. 14 is a schematic diagram illustrating an example apparatus that includes plural cascaded sensors. A single detector may detect outputs of all of the cascaded sensors.
Figure 15:
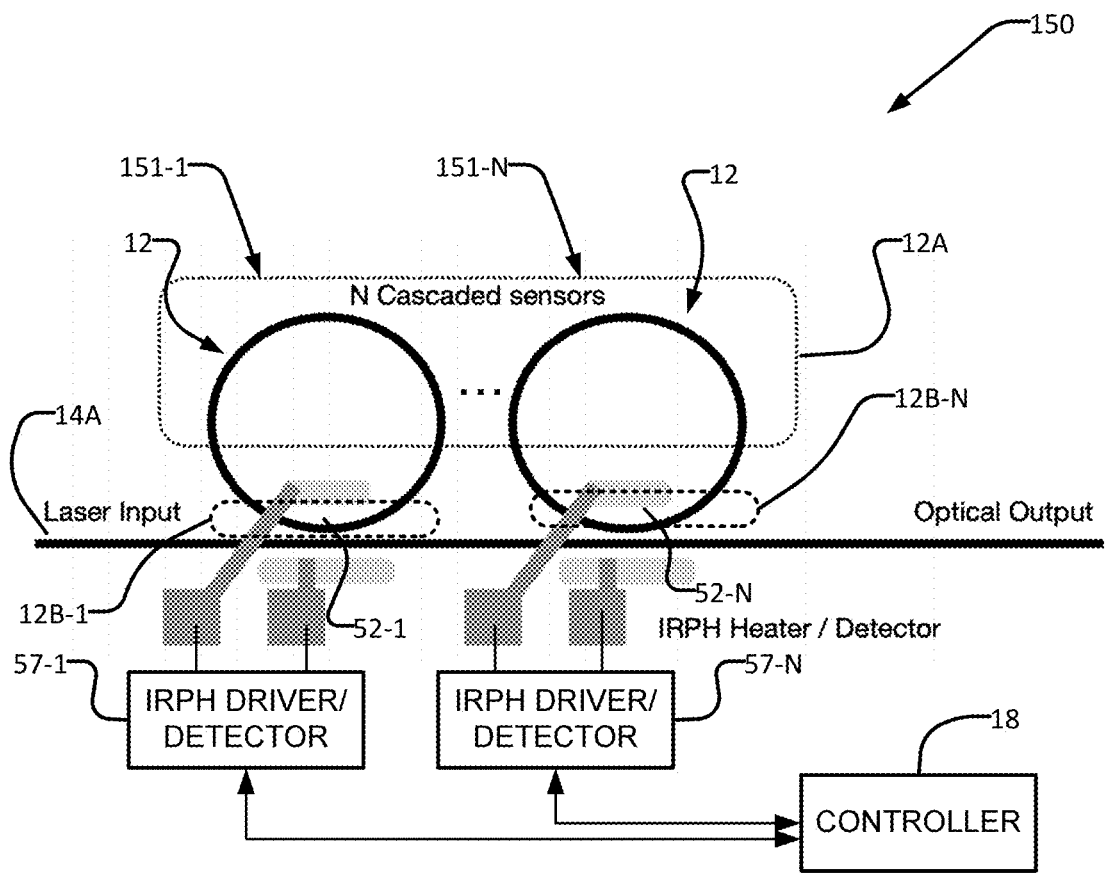
FIG. 15 is a schematic diagram illustrating an example apparatus that includes plural cascaded sensors in which each sensor has its own heater and detector.

FIGS. 14 and 15 show non-limiting examples of apparatus that includes plural resonators 12 (individually identified as 12-1, 12-2 etc.). Such apparatus may deliver light to plural resonators 12 from a single light source (e.g. a single laser). Such apparatus optionally include a single detector connected to detect output light modulated by plural resonators 12.

FIG. 14 shows example apparatus 140 which comprises a plurality of cascaded sensors 141-1 . . . 141-N (collectively or generally sensors 141). N may be any suitable number of sensors 141 such as 2, 3, 4, 10, 20 etc. FIG. 14 illustrates the case where all of sensors 141 are monitored by a single light detector 16. Sensors 141 may, for example, be of any of the types illustrated in FIG. 1, 4, 7, 8, 9, 10 or 11 or any variation thereof. In apparatus 140 phase modulation for sensors 141 is provided by a heater 12C. However, other mechanisms for phase modulation of sensors 141 are also possible.

Different ones of sensors 141 may be exposed to the same or different fluids. For example, in some embodiments, parts 12A of some or all different sensors 141 may be in different chambers which may contain different samples for analysis and/or calibration fluids. In some embodiments sensing regions 12A of a group of two or more sensors 141 or of all sensors 141 are located in a common chamber that can receive a sample for testing (e.g. a blood sample).

To facilitate separate readout of different sensors 141, sensors 141-1 to 141-N may be configured to be resonant with the wavelength of light from a light source 15 at different times. For example, in the absence of phase modulation applied in region 12B, sensors 141-1 to 141-N may have different resonant wavelengths. This may be achieved for example by making resonators 12 of sensors 141-1 to 141-N to have different dimensions and/or of different materials (e.g. differently doping the material of resonators 12). This facilitates use of a single light detector 16 to detect outputs from each of sensors 141-1 to 141-N.

In apparatus 140 sensors 141-1 to 141-N share a single heater 12C that controls the phase shift applied in regions 12B so that the resonant wavelengths of resonators 12 of sensors 141-1 to 141-N can be controlled to shift simultaneously my modulating power delivered by heater 12C. Detector 16 thus measures simultaneously a proxy to the optical spectra of resonators 12 of each of sensors 141-1 to 141-N, where the independent wavelength variable is replaced by the heater power, which is modulated in time. The output signal of light detector 16 may then be analyzed to determine the shift in the resonant wavelength for each resonator 12, thereby extracting information about the analytes to which each sensor 141 is exposed in region 12A.

In some embodiments, heater 12C is configured to affect different ones of sensors 141-1 to 141-N differently, for example the length of a waveguide of different resonators 12 that are heated by heater 12C may be different so that for the same temperature of heater 12C different phase shifts are applied to different ones of resonators 12. This construction may be applied to help separate features corresponding to resonances of individual sensors 141 in the light detected by light detector 16.

In some embodiments, the phase shifts applied to individual sensors 141 is individually controllable (e.g. by providing separate phase shifting mechanisms such as separate heaters, separate IPRH devices or other suitable phase shifting mechanisms including those described elsewhere herein). In such embodiments the phase shift modulation applied to sensors 141-1 to 141-N may be coordinated to cause features (e.g. resonant peaks or valleys) in optical output signals of different ones of sensors 141-1 to 141-N to be presented at detector 16 at different times.

FIG. 15 shows another example apparatus 150 that is similar to apparatus 140 and includes cascaded sensors 151-1 to 151-N (collectively or generally sensors 151). Each of sensors 151 may include a resonator according to any of the examples described herein and variations thereof that is optically coupled to waveguide 14 that carries light from a light source 15 as described herein (not shown in FIG. 15). The light may be supplied at laser input 14A.

Apparatus 150 differs from apparatus 140 in that heater 12C is replaced with individual IPRH 52 (labelled 52-1 to 52-N). Each IPRH 52-1 to 52-N may be operated to control the resonant wavelength of the resonator 12 of the corresponding sensor 151 (e.g. by modulating a phase shift provided by a corresponding one of regions 12B-1, . . . , 12B-N). Each IPRH 52-1 to 52-N may optionally be operated to read out the corresponding sensor 151.

In apparatus 140 and apparatus 150 it is desirable that the resonance frequencies of different ones of resonators 12 be distinct and not spectrally overlapping, otherwise it tends to become difficult to extract the information from individual sensors. This is because when resonant frequencies of different resonators 12 in apparatus 140 or 150 are too close there will be cross-talk between the different sensor readings. The crosstalk arises from a mechanism similar to what happens in a ring resonator-based data communication system as described, for example, in [H. Jayatilleka et al, *Crosstalk in SOI Microring Resonator-Based Filters*, IEEE JLT Vol. 34, Issue 12, pp. 2886-2896 (2016).

The maximum practical number of sensors in a multiplexed system of the types illustrated in FIGS. 14 and 15 is related to the Finesse of the resonators, where Finesse is the ratio of a resonator's free spectral range (FSR) to the resonator's optical linewidth.

In some embodiments that include three or more cascaded sensors, outputs from some of the sensors are read out using a combined detector 16 while outputs of one or more of the sensors is read out using a separate detector (e.g. a corresponding IPRH 52). In some embodiments outputs of one or more sensors may be read out both by a shared detector 16 and a dedicated detector (e.g. an IPRH 52).

In some embodiments, a system of multiplexed or cascading sensors as described herein (e.g. a system as illustrated in FIG. 14 or 15) includes one or more tunable couplers (e.g. a tunable coupler 119 as illustrated in FIG. 11) that optically couple resonators of different sensors to a waveguide 14 that carries light from a light source. A single control input may control coupling to two or more resonators. For example, a common heater may control coupling of two or more different resonators to a waveguide 14. Providing optical couplers under common control for two or more sensors can be particularly useful in the case where each of the sensors are sensing analytes from the same source (e.g. the same sample of blood or other fluid).

Figure 16:
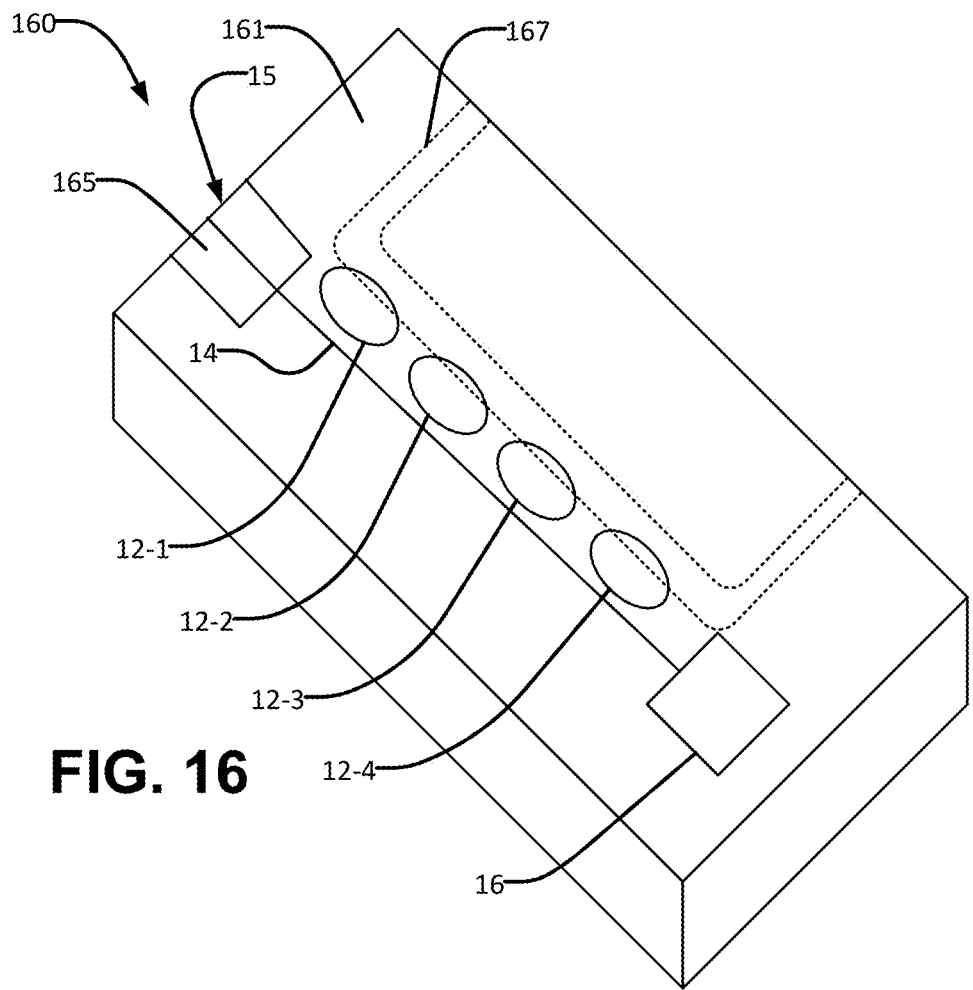
FIG. 16 is a schematic view of a chip carrying plural sensors.

FIG. 16 illustrates an example testing apparatus 160. Apparatus 160 comprises a chip or substrate 161 that accommodates one or more sensors according to any embodiment described herein. The illustrated embodiment comprises a light source 15 comprising a laser 165 formed on substrate 161.

An output of laser 15 is optically connected to a waveguide 14. Such connections may for example be provided by integrated photonic circuits or using photonic wirebonding (PWB) techniques. An advantage of integrating laser 15 on chip 161, either monolithically or attached through techniques such as photonic wire bonding advantageously can reduce noise due to mechanical vibration and may improve the system limit of detection.

One or more resonators 12 (12-1 to 12-4 are shown by way of illustration) are formed on substrate 161. Portions of resonators 12 project into a fluid environment suitable for bringing a sample and/or calibration fluids and/or functionalizing agents into contact with sensing portions of resonators 12. In the illustrated embodiment the fluid environment is provided by a microfluidic channel 167 into which a sample that may contain one or more analytes may be delivered. The portions of different ones of resonators 12 that project into channel 167 may be functionalized to bind to or otherwise interact with corresponding different analytes.

In some embodiments, apparatus 160 is configured with electrical contacts to interface to a control system configured to control and read out sensors of apparatus 160 as described herein. Apparatus 160 comprise a disposable item. Apparatus 160 may be used for testing fluids such as blood, environmental samples, industrial samples etc. Apparatus 160 may have any suitable arrangement of microfluidic passages 167 to bring samples, calibration fluids or the like to one or more sensors on substrate 161 with any desired timing.

In some embodiments apparatus 160 includes on-board electronics which may be integrated into chip 161 and/or packaged in another way (e.g. on a circuit board or other electronics platform electrically connected to chip 161). The electronics may control operation of the sensors and/or process data from the sensors to determine whether certain analyte(s) are present in a sample and if so what are the concentration(s) of the analyte(s). In some embodiments the onboard electronics monitor changes over a time span which permits analysis of kinetics of an interaction between an analyte and functionalization on resonators 12 (e.g. kinetics of binding or other detection reaction of an analyte to the functionalization of a specific resonator 12) In some embodiments apparatus 160 includes a wireless data transmitter operable to transmit data and/or results for a sample to one or more other devices.

Figure 16A:
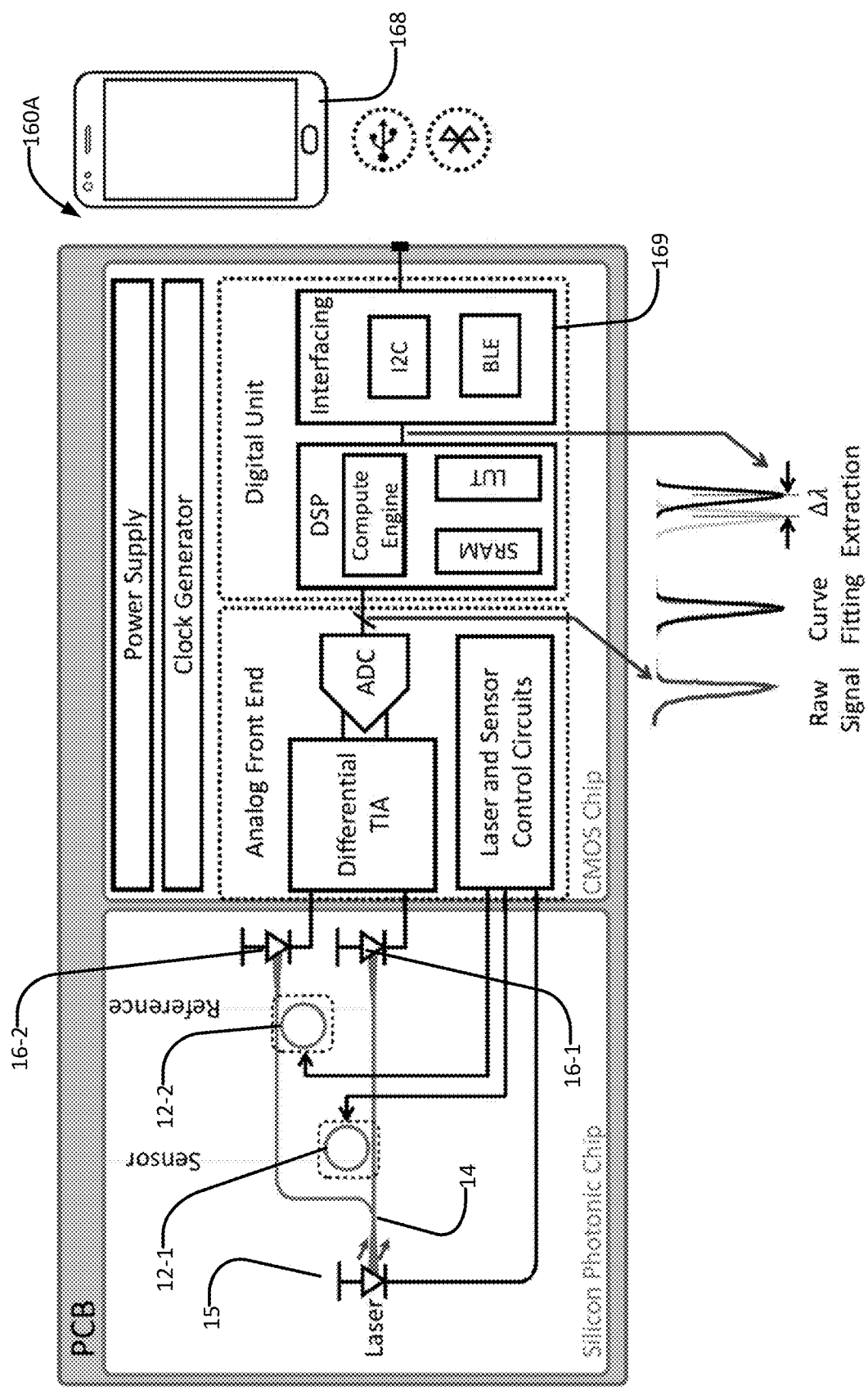
FIG. 16A is a schematic/block diagram illustrating another apparatus that includes sensors as described herein in combination with control and processing circuitry.

FIG. 16A is a block and schematic diagram showing another example apparatus 160A that includes a laser and plural sensors as described herein integrated with circuits configured to control the sensors, acquire data from the sensors and process the acquired data.

Apparatus 160A is an example of apparatus which includes two sensors as described herein. A first sensor 12-1 acts as a sample sensor and is exposed to a sample to be analyzed for one or more analytes. A second sensor 12-2 acts as a reference sensor and is exposed to a reference fluid such as distilled water. Sensors 12-1 and 12-2 may otherwise be the same. Outputs of sensors 12-1 and 12-2 are respectively detected by light detectors 16-1 and 16-2. Outputs of light detectors 16-1 and 16-2 are amplified by a differential trans impedance amplifier and digitized by an analog to digital converter. Any type of sensors as described herein may be used as a reference sensor and corresponding sample sensor.

Apparatus 160A includes one or more data processors (Digital Unit) configured to process the digitized differential output signal.

Apparatus 160A includes one or more wireless communication transmitters 169 that may be operated to transmit data and/or results obtained by processing the data to an external device such as a smart phone 168 or another networked computing device.

Sensors as described herein may be calibrated using known concentrations of analytes of interest. The timing of detected features in detected light (e.g. peaks or valleys) may be measured relative to the phase shift control signal (e.g. an electrical current driving a heater 12C). In this manner one can obtain measurements which show the timing of the peaks or other features of the detected light for various concentrations of the analyte of interest. A calibration function or lookup table may be constructed from these values.

Precise times for the features (peaks) may be determined by fitting a function e.g. a Lorentzian lineshape function to the peaks. Shifts in the timing of peaks may be correlated to analyte concentrations.

In some embodiments the timing of readout features (peaks) may be measured for two or more sensors. For example, an active sensor may be exposed to a certain concentration of an analyte of interest and another "calibration" sensor may be exposed to a calibration substance such as distilled water. The relative timing of peaks from the two sensors may be measured and used for calibration. Using the relative timing of an active sensor and a calibration sensor may be advantageous since changes in factors such as ambient temperature, heater sweep rate, etc. may affect both the active sensor and the calibration sensor equally such that measurements based on that relative timing may be relatively insensitive to such changes.

In some embodiments calibration information such as a calibration function or lookup table are stored in a data store accessible to a controller as described herein. Such data may for example be stored in a data store on substrate 161 of apparatus 160.

In some embodiments apparatus as described herein may be applied to obtain "sensorgrams" which measure dynamic changes in sensor readouts as the sensors are exposed to an analyte. A sensorgram may be obtained by measuring variations in the timing of a peak from a sensor at various times after a sample has been applied to the sensor.

In some embodiments outputs from one or more sensors as described herein may be input to an artificial intelligence such as a neural network (NN) that has been trained to associate patterns (e.g. sensorgrams, comparisons of output signals from different sensors etc.) in the sensor outputs with different analytes of interest and/or different concentrations of analytes of interest. This may help to rapidly or accurately (or both) determine whether a particular analyte of interest is present or not present. Use of a trained NN may also help to process data from multiple sensors that are configured to detect multiple different analytes of interest.

Figure 17A:
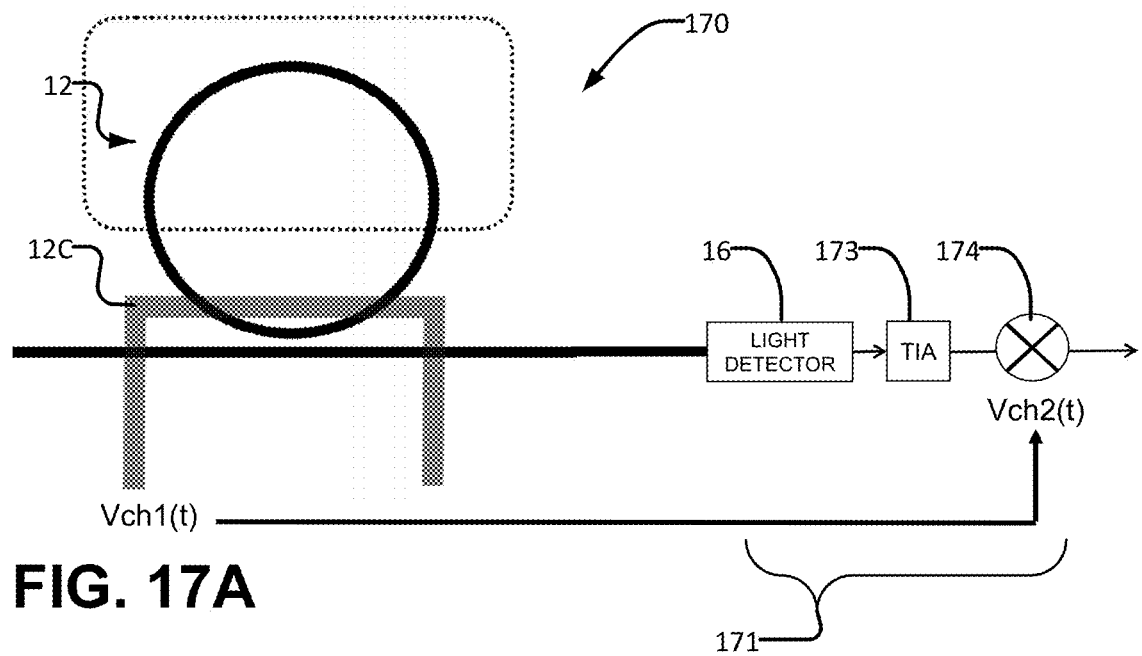
FIGS. 17A and 17B are schematic/block diagrams illustrating example embodiments of apparatus that include lock-in detection systems.
Figure 17B:
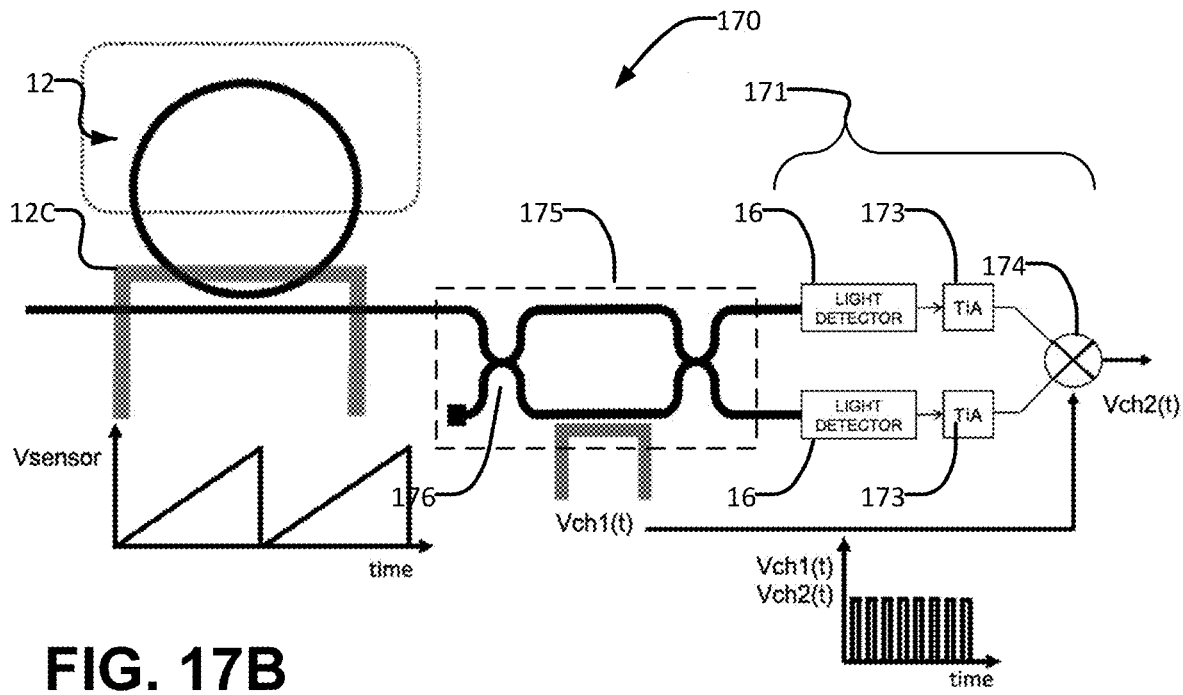

Various optical detection schemes may optionally be applied to improve the accuracy of apparatus as described herein. Some examples of such schemes are described below. FIGS. 17A and 17B show example apparatus 170 that is similar to apparatus 10 of FIG. 1 with the addition of a readout system 171 and an optical switch in FIG. 17B. The optical switch may, for example, be implemented by a Mach-Zehnder interferometer, ring resonator, etc. FIG. 17B shows an implementation with a switch 175 based on a Mach-Zehnder interferometer configuration. Readout system 171 may also be used in combination with other apparatus as described herein.

Readout system 171 functions in a manner similar to a lock-in amplifier. A periodic signal $V_{ch1}(t)$ is applied to drive a heater (e.g. heater 12C) in a portion of the sensor (FIG. 17A) or in an optical switch 175 after the sensor (FIG. 17B). A lock-in signal $V_{ch2}(t)$ is derived from $V_{ch1}(t)$. The lock-in signal $V_{ch2}(t)$ has a set phase relationship to $V_{ch1}(t)$ (FIG. 17A) or is the same as Vch1(t) (FIG. 17B). Lock-in signal Vch2(t) may, for example be a train of short square pulses. The lock-in signal Vch2(t) is then applied together with the output signal from the light detector 16 to a mixing circuit 174 whose output is integrated over a plurality of (in some embodiments a large number of) cycles of Vch1(t). This reduces the noise due to mechanical vibrations, electronic circuits, etc.

This may be repeated with different phase relationships of Vch2(t) to Vch1(t) to obtain integrated output values corresponding to different phase shifts. The resulting outputs may be processed to detect peaks corresponding to the presence of an analyte at a particular concentration level.

In the embodiments illustrated in FIGS. 17A and 17B, light output from the sensor is detected at photodetector 16. An electrical current signal output by photodetector 16 is converted to a voltage signal by transimpedance amplifier 173. The voltage signal output by transimpedance amplifier 173 is combined at mixer 174 with signal Vch2(t).

Some embodiments apply coherent light detection. Coherent light detection can detect both phase of detected light relative to a reference phase and amplitude of the detected light. Detecting both phase and amplitude (coherent detection) can reduce or eliminate the sensitivity fading and directional ambiguity issues that are typically associated with readouts of interferometric sensors. Coherent detectors are described, for example in I. Molina-Fernandez et al, *Fundamental limit of detection of photonic biosensors with coherent phase read-out*, Optics express, vol. 27, no. 9, April 2019, 12616-12629.

Coherent light detection typically does not perform well for detecting output of sensors which include ring resonators driven by fixed wavelength light unless the ring resonator is close to being resonant with the fixed wavelength light and the coupling between the ring resonator and the waveguide that provides the light is close to critical coupling.

Figure 18:
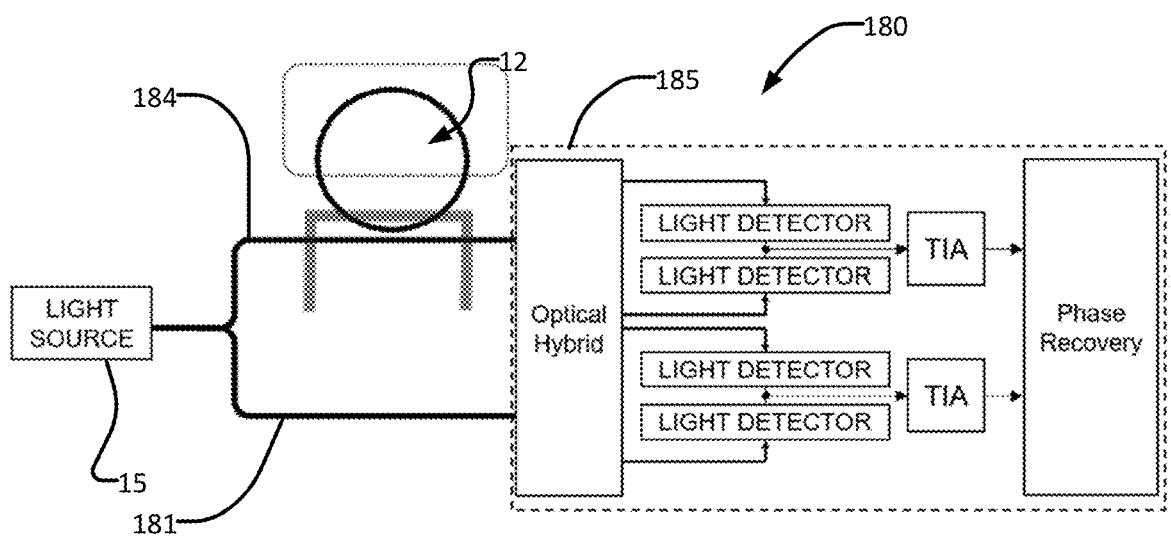
FIG. 18 is a schematic diagram illustrating an example embodiment comprising a ring resonator and a coherent light detector.

FIG. 18 shows an example apparatus 180 which implements an example coherent detection arrangement. In apparatus 180, light from laser light source 15 is split into a reference beam carried by reference waveguide 181 and a sensor beam carried by sensor waveguide 184. Sensor waveguide 184 is optically coupled to a ring resonator 12 (which may be configured according to any embodiment described herein).

Both reference waveguide 181 and sensor waveguide 184 deliver light to a coherent detector 185. To improve performance of coherent detector 185, a phase shift mechanism is used to bring the resonant frequency of resonator 12 close to the frequency of the light from laser light source 15. This may be achieved, for example, by applying a constant bias current to a heater that heats the material of a part of a waveguide of ring resonator 12. In some embodiments the same heater 12C is used to modulate (e.g. sweep) the phase shift applied in portion 12B of resonator 12 to an optimum phase shift selected to adjust the resonant frequency of ring resonator 12 relative to the frequency of the light supplied by laser light source 15 for proper functioning of coherent detector 185.

A tunable coupler 119 (see e.g. FIG. 11) may optionally be provided in apparatus 180 to adjust optical coupling of ring resonator 12 to sensor waveguide 181 for optimal performance of coherent detector 185.

Apparatus that employs coherent detection (e.g. apparatus like apparatus 180 of FIG. 18 optionally includes noise reduction circuitry similar to that shown in FIG. 17.

Figure 19:
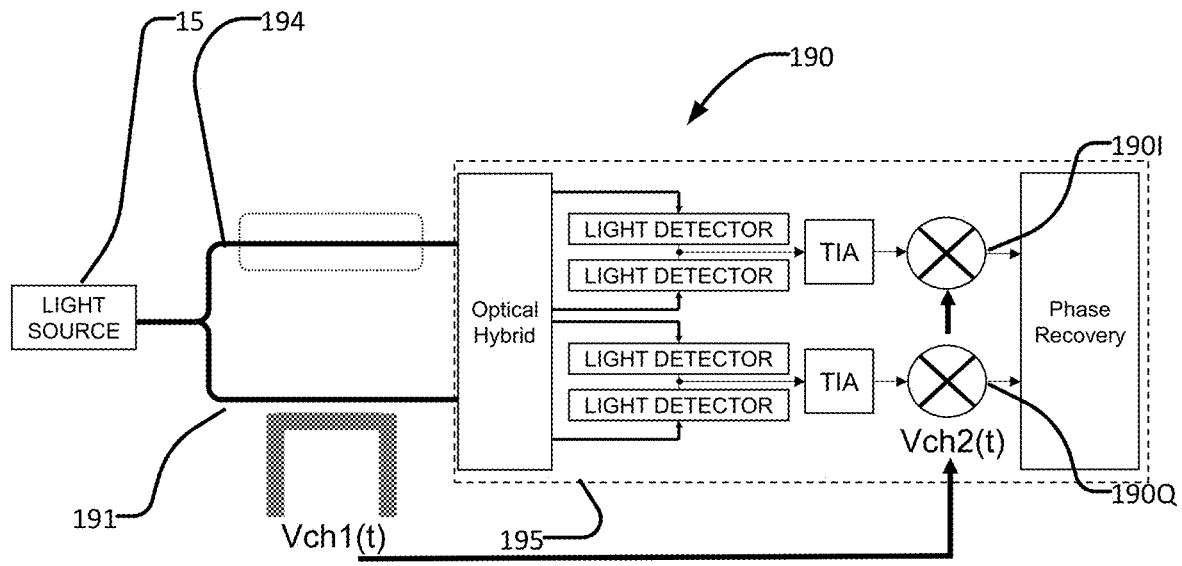
FIGS. 19 and 20 are schematic illustrations of example embodiments that combine coherent light detection and a lock-in detection system.

FIG. 19 shows an example apparatus 190 that includes a phase shift mechanism that is configured to vary a phase shift applied to signal waveguide 191 according to a signal Vch1(t). Signal Vch1(t) may, for example, control or correspond to a signal driving a heater. A lock-in signal Vch2(t) is derived from signal Vch1(t).

Coherent detector 195 is like coherent detector 185 with the addition of mixers 190I and 190Q. Lock-in signal Vch2(t) is mixed with inphase and quadrature signals at mixers 190I and 190Q respectively.

Figure 20:
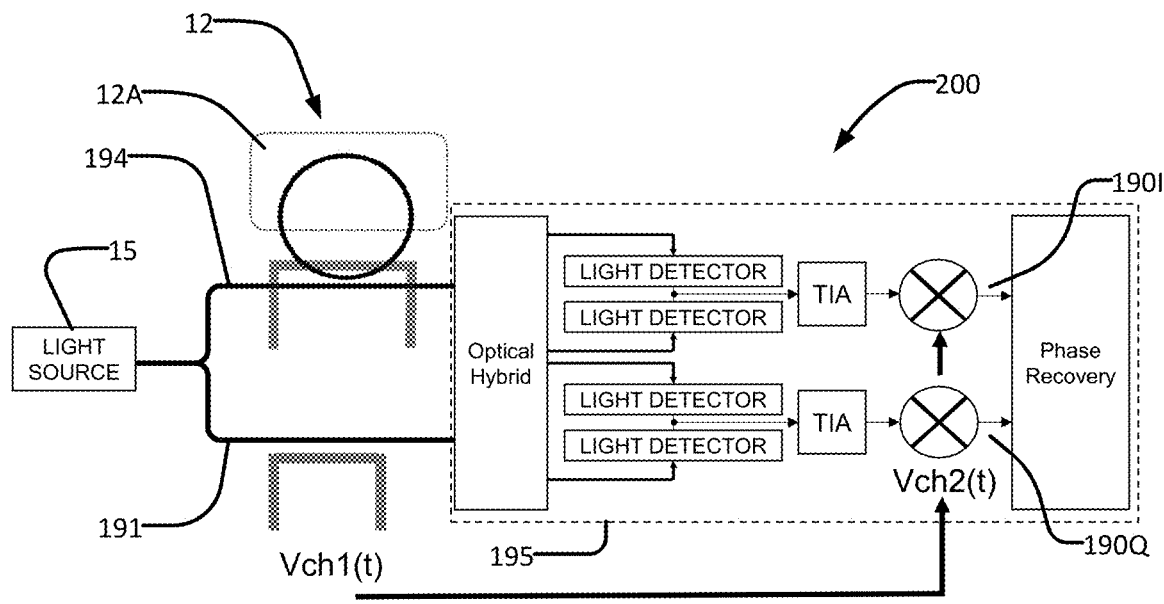

FIG. 20 shows example apparatus 200 that has a coherent detector 195 like that of apparatus 190 except the sensor has a configuration like that of apparatus 180 (FIG. 18). Signal Vch1(t) may, for example, control or correspond to a signal driving a heater at the waveguide 191 or 194. A lock-in signal Vch2(t) is derived from signal Vch1(t).

In some embodiments apparatus as described herein comprises one or more additional heaters. The additional heaters may include a sensor heater that is located and controllable to selectively heat sensor region 12A and/or a sample heater disposed to selectively heat a sample being introduced into the sensor region of apparatus as described herein. The additional heater(s) may, for example comprise a resistive heater comprising a metallic material or doped semiconductor through which an electrical current can be passed to heat the sensor region. An example additional heater 12D is schematically illustrated in FIG. 1. Any other embodiment as described herein may include one or more additional heaters. Additional heaters may be integrated within sensing region 12A or elsewhere in a fluid path by way of which samples and or reference fluids are delivered to sensing region 12A.i Local heating of the waveguide surface or sample may be used to monitor the thermal stability of functionalized waveguide surfaces (e.g., assessing the thermal stability of new or existing specific detection receptors such as antibodies and/or aptamers). For example an additional heater 12D may be operated to raise a temperature of a functionalized waveguide to a temperature in the range of about, 20-90° C. At a temperature of interest, instability of functionalized surfaces of waveguide 13 may be detected by analysis of resonance peak shifts indicative of removal/desorption of the functionalization chemistry, or change/denaturation of the functionalization chemistry, either of which may result in a refractive index change (e.g., removal of antibody or aptamer from the waveguide surface would result in a negative peak shift by decreasing the effective refractive index).

Instability of functionalization of waveguide 13 or temperature dependent behavior of one or more analytes in a sample may also be assessed as a function of temperature. This may be done, for example by monitoring a difference in output of a sensor as described herein connected to receive a sample in sensor region 12B and another sensor, preferably of the same type that has a reference fluid (e.g. distilled water, a buffer or the like) in sensor region 12B. Operating conditions of both the sample sensor and the reference sensor may be kept the same. Data from the sample and reference sensors may be processed to assess stability of the functionalization of waveguide 13.

Local heating may also be applied to analyze molecular conformation or other properties of biological molecules in a sample (e.g., through DNA or aptamer melting curve analysis). For example heat induced changes in an analyte of interest (e.g. "melting") may be monitored by varying (e.g. sweeping) a temperature of sensor region 12A. For example, temperatures in the range of about 40, 50 or 60° C. to about 98° C. may be used to obtain additional information about analytes that are biological molecules. Specific temperature ranges may be selected for the specific analyte(s) of interest. In such applications, melting temperatures (e.g., of DNA or aptamer) may be assessed by monitoring changes in resonance peak shifts (which can result from changes in the effective refractive index of waveguide 13 introduced by melting of an analyte that is bound to or otherwise interacting with waveguide 13). Melting temperature analysis can aid understanding of the structure and stability of the analyte(s) of interest.

Principles of melting temperature analysis are described, for example in: Luo et al. *Developing a combined strategy for monitoring the progress of aptamer selection*. Analyst, 2017, 142, 3136; and Ririe, Rasmussen, and Wittwer. *Product Differentiation by Analysis of DNA Melting Curves during the Polymerase Chain Reaction*. *Analytical Biochemistry*, 1997, 245, 154-160.

Sample heating may also be beneficial in characterizing temperature-dependent reactions of an analyte of interest.

In applications where the temperature of sensing region 12B is varied (e.g. by sweeping) it can be necessary to separate the effects on the optical output of a sensor (any sensor as described herein) which result from changes in the functionalization chemistry and/or the analyte of interest or the interaction of the functionalization chemistry and/or the analyte of interest with the waveguide from other effects on the optical output of the sensor that result from the change of temperature of the waveguide. Various approaches may be taken to provide such correction or compensation.

One approach is to use the combination of a reference sensor with a sample sensor as described above. The differential output of the reference and sample sensors may be monitored and processed.

Another approach operates a phase shift modulator (e.g., heater), external to sensing region 12B (e.g. a heater 12C or equivalently an IPRH) to isolate surface/sample-induced effects on the resonance of a resonator from resonance changes which arise from the changes of temperature of the waveguide in sensing region 12B. With this approach, the phase shift modulator external to sensing region 12B may be operated to compensate for phase shift arising from heating within sensing region 12B.

Another approach applies multi-dimensional calibration information which includes temperature of sensing region 12B to correct for any effect of the heating of sensing region 12B on the resonant behavior of a resonator 12. Such calibration information may be provided in a calibration function or lookup table and/or may be embodied in a trained neural network which takes a temperature of sensing region 12A or a surrogate for the temperature of sensor region 12A (e.g. a heater control current or other heater control signal) as one input together with other data to be processed (e.g readings from one or more light detectors.

Interpretation of Terms

Unless the context clearly requires otherwise, throughout the description and the claims:
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Controllers for example embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Where a component (e.g. a light source, waveguide, software module, light detector, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for monitoring a sample for at least one analyte, the method comprising:
    placing the sample in contact with a sensing portion of an optical waveguide and directing light having a fixed wavelength through the optical waveguide, wherein contact of the analyte with the waveguide alters a phase shift of the light effected by the sensing portion of the optical waveguide;
    modulating a phase shift of the light effected by a phase shift portion of the waveguide distinct from the sensing portion of the waveguide;
    monitoring an intensity of the light relative to the phase shift of the light effected by the phase shift portion of the waveguide; and
    wherein the sensing portion of the optical waveguide is part of a first one of a plurality of sensors connected in a cascade and the method comprises using an optical detector common to the plurality of sensors to monitor the intensity of the light relative to a corresponding phase shift of the light effected by the corresponding phase shift portion of the waveguide for each of the plurality of sensors.

2. The method according to claim 1 wherein modulating the phase shift of the light effected by the phase shift portion of the waveguide comprises one or more of: heating the phase shift portion of the waveguide;
    modulating carrier injection in a PIN junction integrated with the phase shift portion of the waveguide; modulating carrier depletion in a PN junction integrated with the phase shift portion of the waveguide; modulating an electro-optic effect in the phase shift portion of the waveguide; and modulating a phase shift applied by a polymer phase modulator that is incorporated into the phase shift portion of the waveguide.

3. The method according to claim 1 wherein the waveguide comprises an optical resonator and modulating the phase shift effected by the phase shift portion comprises causing the resonator to pass through at least one resonance.

4. The method according to claim 3 wherein the resonator comprises a plurality of sections of the waveguide connected to form a closed loop and different ones of the sections of the waveguide comprise different waveguide types.

5. The method according to claim 4 wherein the different waveguide types include on or more of:
    solid core waveguide; sub-wavelength grating waveguide; and
    low-loss waveguide.

6. The method according to claim 3 wherein the resonator comprises a ring resonator and the ring resonator comprises one or more of: a solid core waveguide; a sub-wavelength grating waveguide; and sections of low loss waveguide connected between the sensing portion of the waveguide and the phase shift portion of the waveguide.

7. The method according to claim 3 wherein the resonator comprises a ring resonator and the method comprises varying a degree of optical coupling of the waveguide and the ring resonator.

8. The method according to claim 1 wherein the sensing portion of the optical waveguide follows a sinuous path.

9. The method according to claim 1 wherein the waveguide is part of an interferometer and monitoring the intensity of the light is performed at an output of the interferometer.

10. The method according to claim 1 wherein monitoring the intensity of the light comprises coherent detection of the light.

11. The method according to claim 1 wherein modulating the phase shift of the light effected by a phase shift portion of the waveguide comprises periodic modulation at a modulation frequency of at least 60 Hz.

12. The method according to claim 1 wherein the sensor portion of the waveguide is functionalized to analyze for the at least one analyte.

13. The method according to claim 1 comprising processing the intensity of the light relative to the phase shift of the light effected by the phase shift portion of the waveguide to yield an estimated concentration for the at least one analyte.

14. The method according to claim 1 further comprising elevating a temperature of the sensor region.

15. The method according to claim 1 comprising processing the monitored intensity of the light relative to the phase shift of the light effected by the phase shift portion of the waveguide to determine a concentration of the at least one analyte in the sensing region.

16. Apparatus for monitoring a sample for at least one analyte, the apparatus comprising:
    an optical waveguide comprising a sensing portion and a phase shift portion wherein the sensing portion passes through a volume for receiving the sample;
    a fixed wavelength light source coupled to deliver fixed wavelength light into the waveguide;
    a phase shift modulator operative to periodically modulate a phase shift of the light effected by the phase shift portion of the optical waveguide;
    at least one light detector operable to monitor an intensity of the light relative to the phase shift of the light effected by the phase shift portion of the waveguide; and
    a lock-in detection system, the lock in detection system comprising electronics configured to generate a lock-in signal Vch2($t$) from a phase shift modulation control signal Vch1(t), the lock-in signal having a fixed phase relationship to the phase shift modulation control signal; a mixing circuit configure to mix the lock-in signal with an output of the light detector; and an integration circuit configured to integrate an output of the mixing circuit over a plurality of cycles of the phase shift modulation control signal.

17. The apparatus according to claim 16 wherein the phase shift modulator comprises one or more of: a heater located to selectively heat the phase shift portion of the waveguide; a PIN junction integrated with the phase shift portion of the waveguide; a PN junction integrated with the phase shift portion of the waveguide; and a polymer phase modulator that is incorporated into the phase shift portion of the waveguide.

18. The apparatus according to claim 16 wherein the waveguide comprises an optical resonator.

19. The apparatus according to claim 18 wherein the phase shift modulator is configured to cause the resonator to repeatedly pass through at least one resonance.

20. The apparatus according to claim 18 wherein the resonator comprises a plurality of sections of the waveguide connected to form a closed loop and different ones of the sections of the waveguide comprise different waveguide types.

21. The apparatus according to claim 20 wherein the different waveguide types include one or more of: solid core waveguide; sub-wavelength grating waveguide; and low-loss waveguide.

22. The apparatus according to claim 18 wherein the resonator comprises a ring resonator and the ring resonator comprises one or more of: a solid core waveguide; a sub-wavelength grating waveguide; and sections of low loss waveguide connected between the sensing portion of the waveguide and the phase shift portion of the waveguide.

23. The apparatus according to claim 16 wherein the sensing portion of the optical waveguide follows a sinuous path.

24. The apparatus according to claim 16 wherein the waveguide is part of an interferometer and the light detector is connected to monitor the intensity of the light at an output of the interferometer.

25. The apparatus according to claim 16 wherein the light detector comprises a coherent light detector.

26. The apparatus according to claim 16 wherein the sensing portion of the waveguide is functionalized to analyze for the at least one analyte.

27. The apparatus according to claim 16 further comprising a heater associated with the sensor region and operable to selectively elevate a temperature of the sensor region.

28. Apparatus for monitoring a sample for at least one analyte, the apparatus comprising:
   an optical waveguide comprising a sensing portion and a phase shift portion wherein the sensing portion passes through a volume for receiving the sample;
   a fixed wavelength light source coupled to deliver fixed wavelength light into the waveguide;
   a phase shift modulator operative to periodically modulate a phase shift of the light effected by the phase shift portion of the optical waveguide;
   at least one light detector operable to monitor an intensity of the light relative to the phase shift of the light effected by the phase shift portion of the waveguide; and
   an optical switch upstream from the light detector and a lock-in control system configured to switch the optical switch according to a signal Vch1(t) and the apparatus comprises a mixer connected to receive an output of the light detector and to mix a signal Vch2(t) with the output of the light detector.

29. Apparatus for monitoring a sample for at least one analyte, the apparatus comprising:
   an optical waveguide comprising a sensing portion and a phase shift portion wherein the sensing portion passes through a volume for receiving the sample;
   a fixed wavelength light source coupled to deliver fixed wavelength light into the waveguide;
   a phase shift modulator operative to periodically modulate a phase shift of the light effected by the phase shift portion of the optical waveguide;
   at least one light detector operable to monitor an intensity of the light relative to the phase shift of the light effected by the phase shift portion of the waveguide; and
   a second optical waveguide comprising a second sensing portion and a second phase shift portion, wherein the sensing portion passes through a volume for receiving a second sample;
   wherein the light source is coupled to deliver fixed wavelength light into the second waveguide;
   a second phase shift modulator operative to periodically modulate a phase shift of the light effected by the second phase shift portion of the second waveguide; and
   wherein the at least one light detector is operable to monitor an intensity of the light relative to the phase shift of the light effected by the second phase shift portion of the second waveguide.

* * * * *